(12) United States Patent
Leinen

(10) Patent No.: US 8,739,827 B2
(45) Date of Patent: Jun. 3, 2014

(54) SINGLE-LEVER MIXING GEAR FOR A PLUMBING FIXTURE

(75) Inventor: Josef Leinen, Wittlich (DE)

(73) Assignee: CeramTec GmbH (DE)

( * ) Notice: Subject to any disclaimer, the term of this patent is extended or adjusted under 35 U.S.C. 154(b) by 246 days.

(21) Appl. No.: 13/255,330

(22) PCT Filed: Mar. 10, 2010

(86) PCT No.: PCT/EP2010/053019
§ 371 (c)(1),
(2), (4) Date: Sep. 27, 2011

(87) PCT Pub. No.: WO2010/103033
PCT Pub. Date: Sep. 16, 2010

(65) Prior Publication Data
US 2012/0006437 A1    Jan. 12, 2012

(30) Foreign Application Priority Data

Mar. 10, 2009   (DE) .................. 10 2009 001 443

(51) Int. Cl.
*F16K 11/16*    (2006.01)
*F16K 11/18*    (2006.01)

(52) U.S. Cl.
USPC ... 137/607; 137/613; 137/625.17; 137/636.4; 4/675

(58) Field of Classification Search
USPC ........ 137/606, 607, 613, 636, 636.4, 625.17; 4/675–678
See application file for complete search history.

(56) References Cited

U.S. PATENT DOCUMENTS

| | | | | |
|---|---|---|---|---|
| 2,877,797 | A * | 3/1959 | Jordan et al. | 137/625.4 |
| 4,896,381 | A * | 1/1990 | Hutto | 4/695 |
| 6,363,549 | B2 * | 4/2002 | Humpert et al. | 4/623 |
| 2004/0200987 | A1 | 10/2004 | Houghton | |
| 2004/0256009 | A1 * | 12/2004 | Valenzuela | 137/607 |
| 2007/0028975 | A1 | 2/2007 | Herring | |
| 2007/0267074 | A1 | 11/2007 | Houghton | |
| 2007/0289646 | A1 | 12/2007 | Ravedati | |

FOREIGN PATENT DOCUMENTS

DE    91 03 698  U1    6/1991

* cited by examiner

*Primary Examiner* — John Rivell
*Assistant Examiner* — Kevin Barss
(74) *Attorney, Agent, or Firm* — Fulbright & Jaworski LLP

(57) ABSTRACT

Conventional single-lever plumbing fixtures include a so-called cartridge in which the cold and hot water streams fed to said plumbing fixture are discharged into sanitary equipment or are blocked and are mixed with each other.

22 Claims, 15 Drawing Sheets

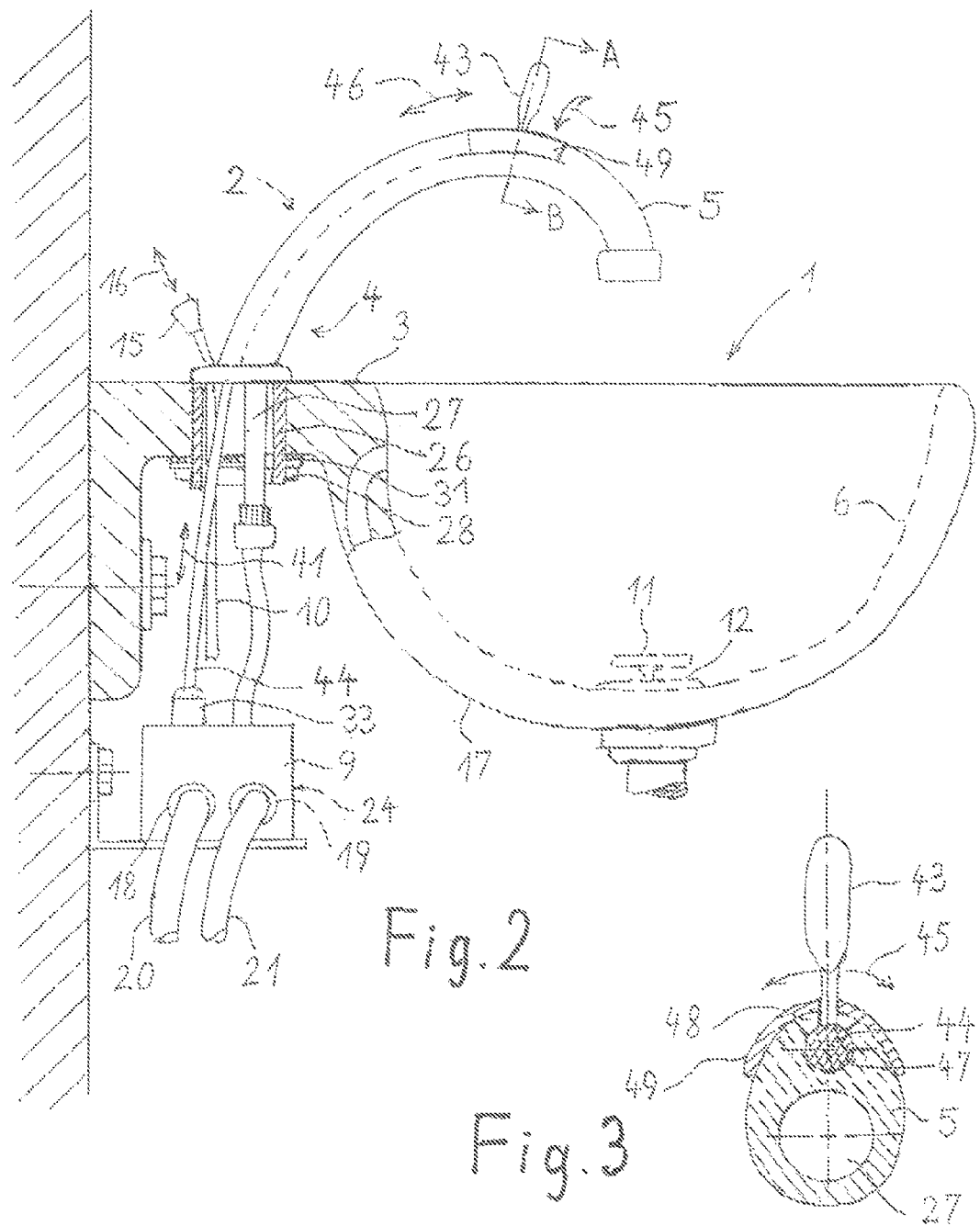

Section A-A

Section B-B

Figure 1:
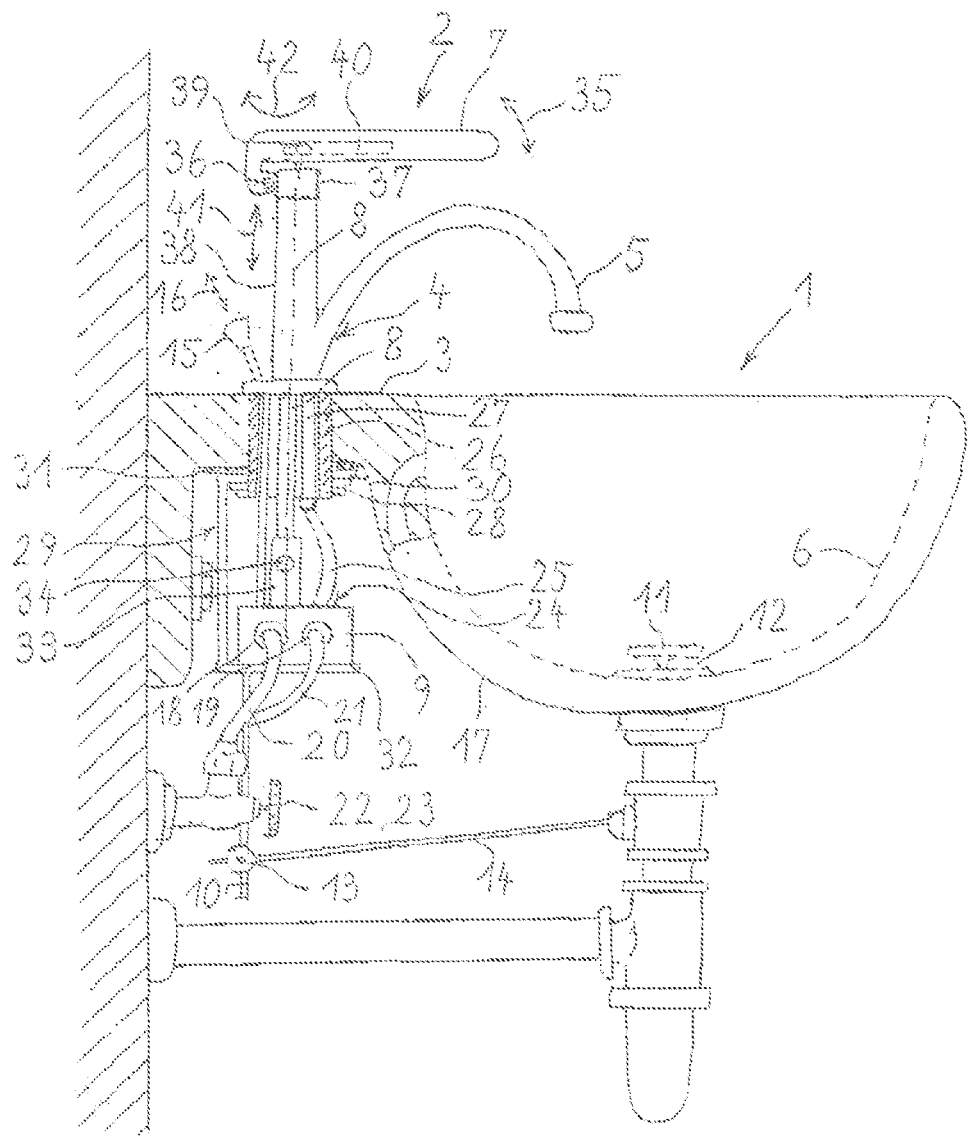

Section C - D - E - F

SECTION C-C

SECTION A-A

Section B-B

SECTION A-A

SECTION B-B

SINGLE-LEVER MIXING GEAR FOR A PLUMBING FIXTURE

RELATED APPLICATIONS

This application is a §371 application of PCT/EP2010/053019 filed Mar. 10, 2010, and claims priority from German Patent Application No. 10 2009 001 443.8 filed Mar. 10, 2009.

The invention relates to a single-lever mixing gear for a water fitting for dispensing water in a sanitary device, the water fitting generally comprising a fitting member which is positioned on the sanitary device and which has a device for actuating the single-lever mixing gear and the single-lever mixing gear containing a cold water and a hot-water supply flow, devices for opening and closing the supply flows and for mixing and limiting the water streams and a mixed water outlet.

Conventional single-lever water fittings as used in sanitary devices, in particular on wash stands, bidets or bathtubs, contain a so-called cartridge in which the cold water stream and hot water stream supplied to the water fitting are released or blocked for discharge into these sanitary devices and mixed with each other. Owing to the cartridges being installed in these water fittings, these water fittings have a diameter and a height which are predetermined by these cartridges and, depending on the size of the cartridge, the diameter may not fall below that value. These water fittings are therefore bulky. In recent years there has been a trend towards converting the once functionally fitted bathroom into a so-called wellness zone, the design of the objects becoming increasingly significant. When configuring the water fittings, however, designers are constrained for the reason set out above. Furthermore, the shaping of the ceramic portions of the cartridges, particularly those for the openings of the control plates, is often complex and therefore difficult to produce.

Therefore, an object of the invention is to provide a single-lever mixing gear which is produced from simply constructed components and which, unlike a cartridge, does not impede the construction of the fitting member of the water fitting.

The object is achieved by means of the characterising features of claim 1. The dependent claims relate to advantageous configurations of the invention.

According to the invention, the single-lever mixing gear and the fitting member of the water fitting are spatially separated from each other. The single-lever mixing gear and the device arranged on the fitting member for actuating the single-lever mixing gear can be mechanically connected to each other or an electrically operated actuation system is provided, for example by means of motors. The fitting member can be conventionally arranged on the sanitary device, a wash stand or a bidet or a bathtub, or, as in a shower, can be arranged on or in the wall whilst the single-lever mixing gear is arranged spatially separately therefrom, for example above or below the sanitary device.

This possibility of freely arranging a single-lever mixing gear allows the designer a free hand in the configuration of the fitting member. Furthermore, the single-lever mixing gear is protected from influx of water from outside and from cleaning agents, which reduces wear and increases the service-life. Because of this protection, a single-lever mixing gear can be readily changed. With conventional water fittings, owing to accumulations of scale and corrosion of threads and seals, it is often no longer possible to change a cartridge, so that the entire water fitting must be replaced.

The single-lever mixing gear according to the invention contains three conventional blocking members, as used to open and close water removal locations or to block pipes. There are used both valves in which a valve disc rests on the valve seat in the closed state and blocking members in which two ceramic plates which are located one on top of the other and which have openings for opening and closing relative to each other are rotated. When the blocking member is in the closed state, the plates mutually cover their openings and, during opening, the openings in the plates are moved into alignment. In accordance with their construction, they therefore equate to sliding valves. That reliable technology which has been found to be advantageous has already been used for decades in the sanitary sector for two-handle fittings.

Since the construction type of the blocking member is not limited to the construction type described for the function of the single-lever mixing gear, for example it is also possible to use ball valves, only the term blocking member will be used below.

The single-lever mixing gear is no longer actuated by means of a tilting lever such as the one which protrudes out of a conventional cartridge. A pin, by means of which the flow Quantity is controlled as far as stoppage of the water, in the case of an upward or downward movement, and the mixing temperature is controlled in the case of a rotational movement, protrudes out of the single-lever mixing gear according to the invention in the case of direct manual actuation. Depending on the embodiment, however, the handles familiar to the operator for the actuation of a water fitting with a cartridge are retained for him: a tilting movement or an upward and downward movement for controlling the volume flow and a rotation to the left or to the right for adjusting the temperature of the mixed water.

The pin projecting out of the single-lever mixing gear can be mechanically connected directly to the device arranged on the fitting member for actuating the single-lever mixing gear, an actuation lever or actuation handle. However, there may also be provided an electrically operated actuation system which is switched on and off, for example, by means of the actuation lever or by means of switches or sensors. The advantage over conventional, contactlessly controlled water fittings having a solenoid valve is that the maximum quantity of water is not provided or stopped abruptly at the outlet, but instead increases slowly or decreases slowly so that spraying in the sanitary device is prevented.

The single-lever mixing gear may be positioned directly on the connections of the domestic supply system. However, it may also be secured to the wall of the room or be arranged below, beside or even above the sanitary device. The single-lever mixing gear may also be secured to the fitting member or to the sanitary device with a connecting portion in a state separated from each other by the sanitary device. That connecting portion is constructed in such a manner that it can be secured to the sanitary device or to the as of the fitting member extending through the sanitary device. The connecting portion may also extend through the sanitary device so that the fitting member can be positioned thereon.

The connecting portion may be constructed in such a manner that there is provided between the sanitary device and the single-lever mixing gear a spacing which allows connection of the pin for actuating the single-lever mixing gear to the device arranged on the fitting member for actuating the single-lever mixing gear. Furthermore, it is possible to connect the pipe from the mixed water outlet of the single-lever mixing gear to the connection of the outlet of the fitting member.

If an electro-motive drive is provided, the spatial requirement for the single-lever mixing gear may be increased.

Space may be necessary for a storage device for electrical energy if connection to the mains supply network is not possible.

The connecting portion may have the appearance, for example, of a U lying flat, one U member carrying the single-lever mixing gear and the other member being connected to the sanitary device or to the fitting member.

Another example of a connecting portion is a pipe which provides openings that are correspondingly large for the above-described connections to be fitted through. The connecting portion is screwed, with its upper end, to the base of the fitting member which extends through the sanitary device and which is therefore fixed to the sanitary device. The base carries the single-lever mixing gear with the connecting portion.

If the sanitary device has a closure member for its outlet which can be actuated from the fitting member, the actuation rod which is provided for this purpose can extend through the connecting portion.

The housing of a single-lever mixing gear according to the invention is constructed in such a manner that it contains all the functional elements necessary for operation. It may comprise any suitable metal material or plastics material and may be a processed block or an injection-moulding component which is adapted to the functional elements which it contains.

It is advantageous, for controlling the water streams, to use conventional blocking members which have a simple structure and which contain, for example, a base plate and a control plate which is arranged for rotation relative thereto for opening and closing, or valve discs which can be raised and lowered. A blocking member is fitted in the hot-water supply flow and in the cold-water supply flow in order to control the mixing temperature of the water and in the mixed water outlet of the single-lever mixing gear in order to control the quantity and to block the mixed water outlet.

The blocking members may be actuated in the case of manual actuation by means of a central spindle, the actuation spindle, which is toothed and which engages with its tooth arrangement in toothed wheels connected to the blocking members. The tooth arrangement for the toothed wheels of the blocking members in the supply flows and the tooth arrangement for the toothed wheel of the blocking member in the mixed water outlet of the single-lever mixing gear are arranged separately from each other on that actuation spindle. In order to convert the pivot movement of the device for actuating the single-lever mixing gear for limiting the quantity into a rotational movement, the tooth arrangement of the actuation spindle is in the form of a toothed rod which is in engagement with the toothed wheel of the blocking member in the mixed water outlet of the single-lever mixing gear. In order to convert the horizontal back and forth movement of the device for actuating the single-lever mixing gear for adjusting the mixing temperature into a rotational movement, the tooth arrangement is in the form of a toothed wheel which is in engagement with at least one toothed wheel of a blocking member in the supply flow of the single-lever mixing gear. The tooth arrangement of the actuation spindle may engage in both toothed wheels of the blocking members of the supply flows. However, it is also possible for the two toothed wheels of the blocking members of the supply flows to be in engagement, the tooth arrangement of the actuation spindle then being in engagement with only one toothed wheel of a blocking member.

The water quantity at the mixed water outlet and the mixing water temperature can be adjusted to maximum or minimum values if mechanical stops are provided in the region of the pivot movement, or upward and downward movement, or back and forth movement of the device for actuating the single-lever mixing gear or in the region of the actuation spindle.

It is thereby advantageously possible to provide scalding protection by the supply flow of hot water being limited, to fix the mixing temperature of the water in a range and to limit the quantity of water being discharged.

In electromotive drives, the blocking members of the supply flows connected via the toothed wheels can be adjusted by a common motor and the blocking member at the mixed water outlet can be adjusted by another motor independently of each other, an actuation spindle not then being necessary.

When the blocking members of the single-lever mixing gear are actuated by motors, it is possible to initiate the opening and closing of the water fitting by sensors which react to contact or proximity. The mixing temperature of the water can be detected by sensors in the outlet and, in the event of deviation from a preset desired value, the necessary quantity of water of the supply flows can be adjusted by means of a speed being set at the motor which actuates the coupled blocking members of the cold and hot water supply flows.

The discharge of the water quantity can also be controlled by means of a flow sensor by the speed of the drive motor of the blocking member being controlled in the mixed water outlet of the single-lever mixing gear.

In stepping motors, it is possible to set the adjustment of the flowing quantity of water by means of the number of steps, angles of rotation or revolutions.

If valve discs which are connected to each other by a spindle and which close alternately are provided as blocking members in the hot-water supply flow and in the cold-water supply flow of the single lever mixing gear, it is possible to provide a mixing water chamber having an expansion member arranged therein. The expansion member is connected to the spindle which actuates the valve discs and controls the position of the valve discs and thereby the water streams in the hot-water supply flow and in the cold water supply flow when the mixing water temperature changes owing to expansion or contraction. That thermostat control advantageously ensures a constant mixing water temperature at the outlet of the water fitting. In the case of an excessively high mixing water temperature which could result in danger to health or in the event of the cold-water supply flow failing, the hot-water supply flow can even be completely blocked.

The blocking member in the hot-water supply flow and the blocking member in the cold-water supply flow are connected together in such a manner that when one supply flow is closed, the other supply flow is opened proportionally with constant pressure in the supply pipes and constant mixing water quantity, as in a conventional cartridge. If a supply flow is completely closed, the other supply flow is completely opened.

When the blocking member is closed, the situation could arise that the water flows from the supply flow having the higher pressure to the supply flow having the lower pressure in the case of different pressures in the hot-water supply flow and in the cold-water supply flow. In order to prevent this, a non-return valve can be fitted in the hot-water supply flow and in the cold-water supply flow, respectively. If the water attempts to flow from one supply flow to the other supply flow, the non-return valve being acted on automatically closes. The non-return valves can even be controlled with appropriate equipment. For instance, the non return valves can be controlled, in the case of a completely closed position of the device for actuating the single-lever mixing gear and therefore a closed blocking member in the mixed water outlet, in such a manner that opening is prevented in any case and the non return valves are released only if the blocking member is opened.

Figure 4:
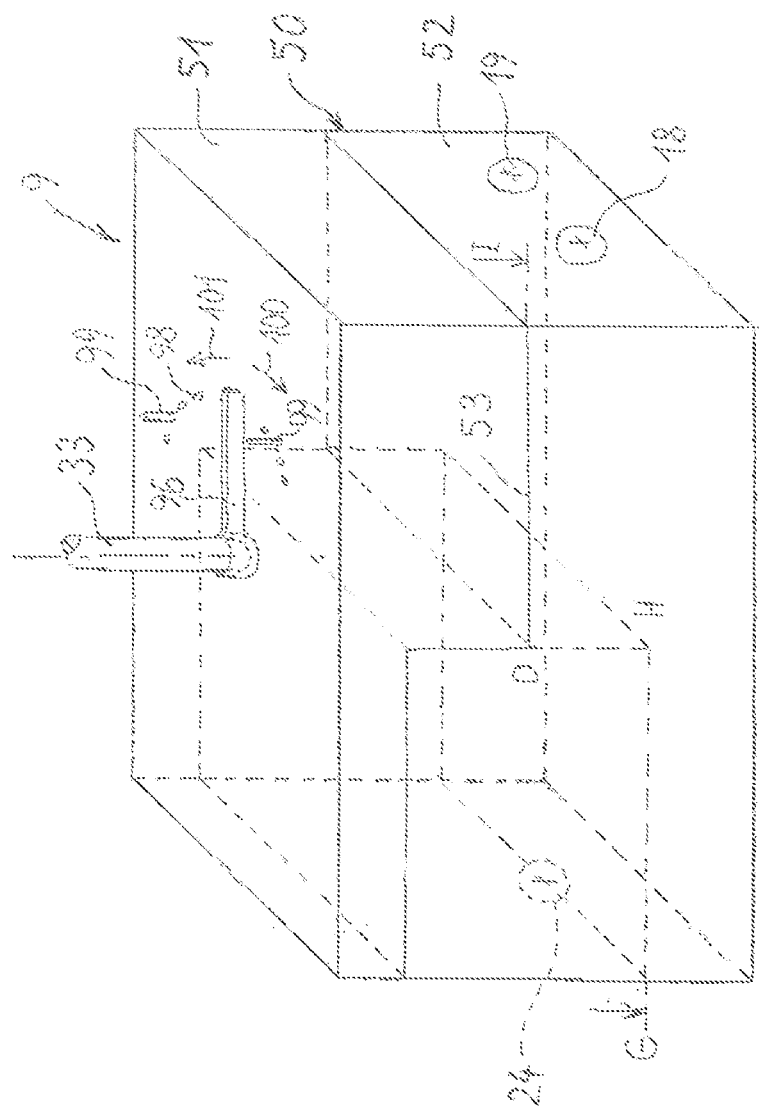
Figure 5:
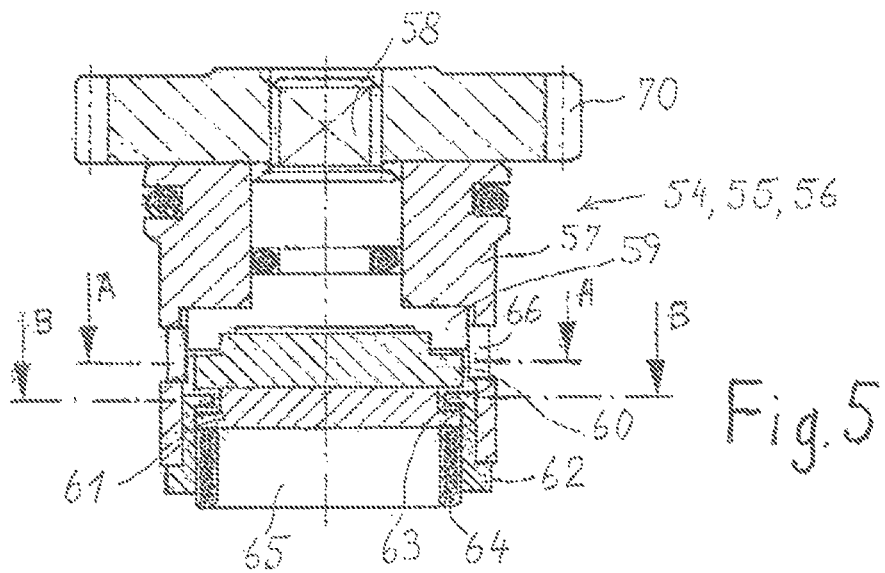
Figure 6:
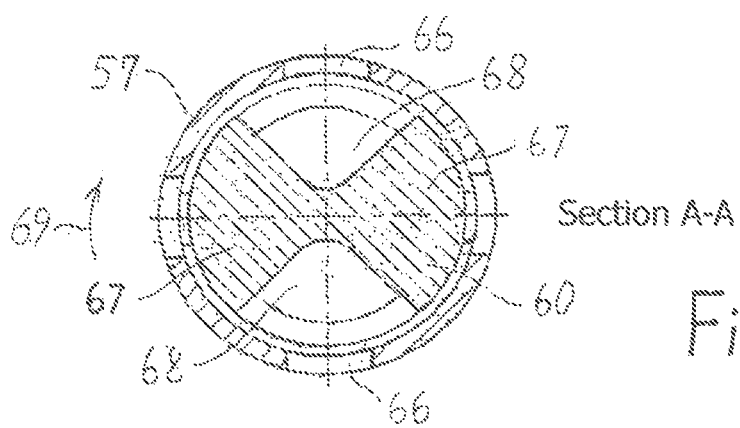
Figure 7:
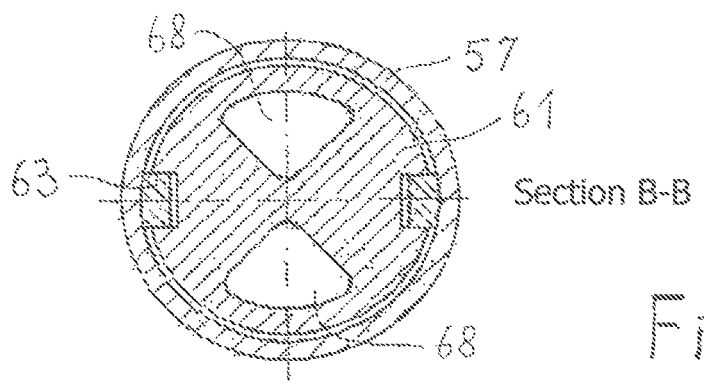
Figure 8:
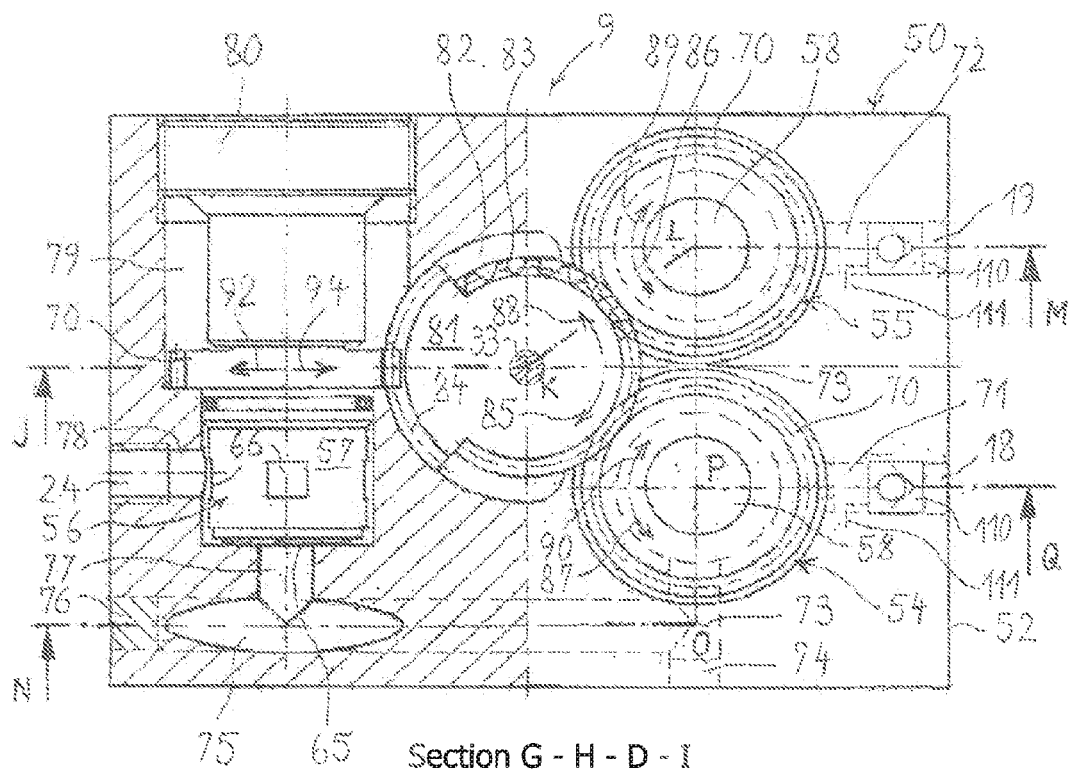
Figure 9:
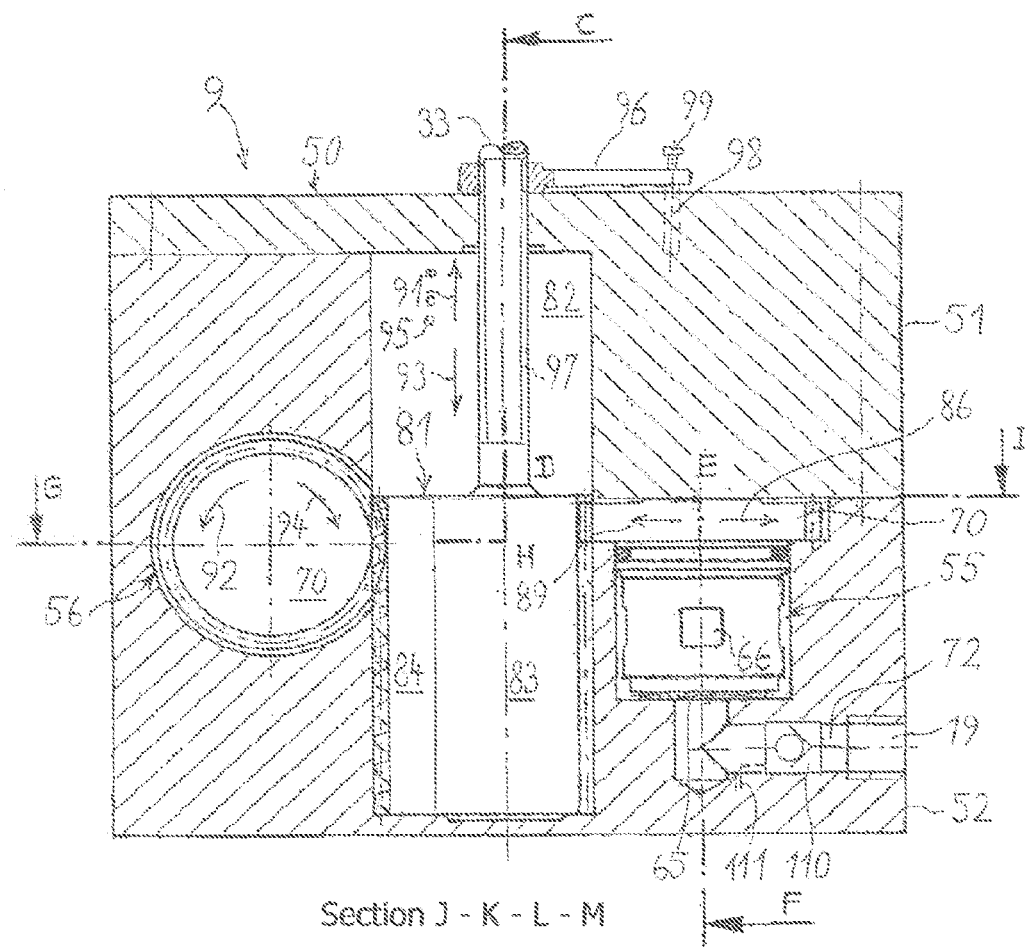
Figure 10:
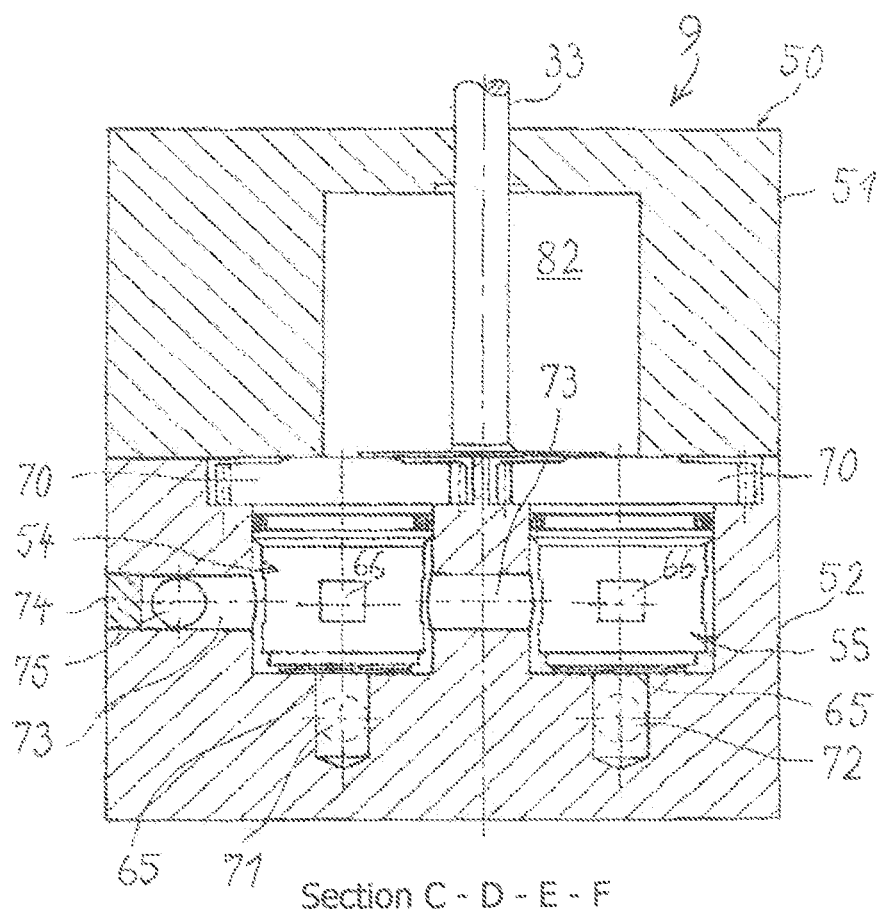
Figure 11:
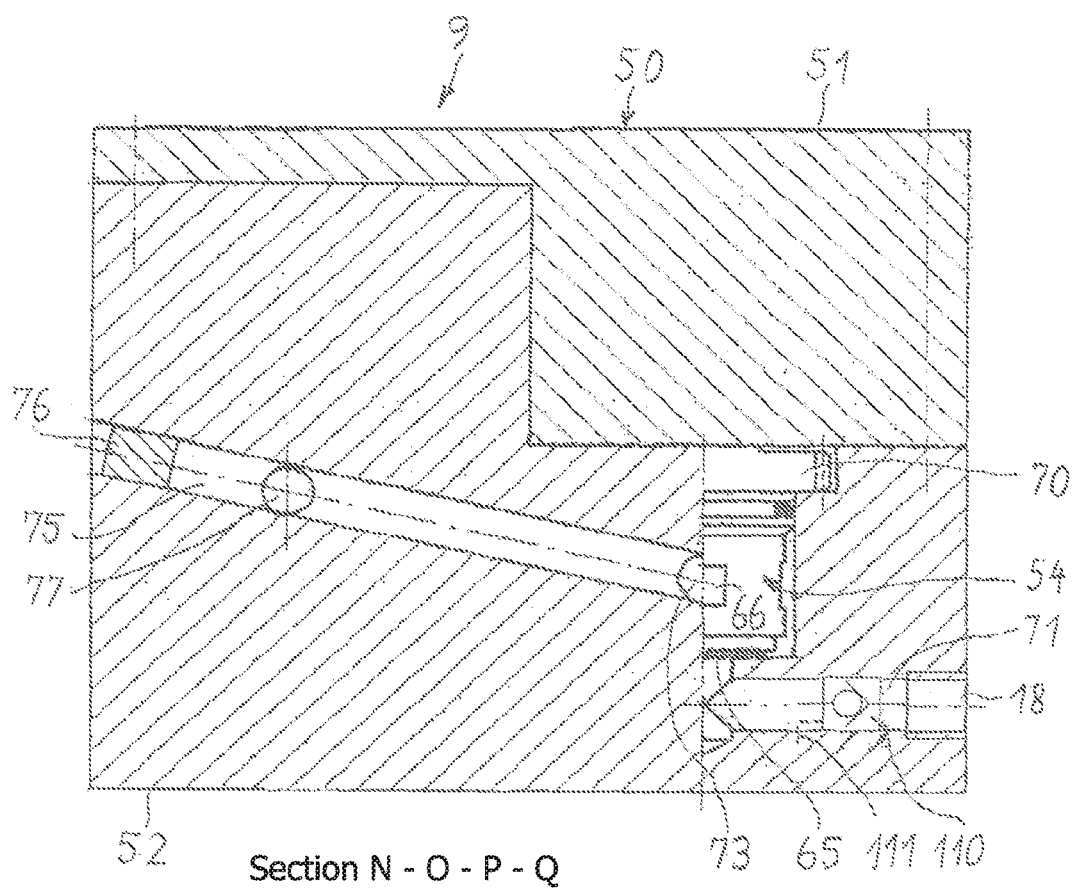
Figure 12:
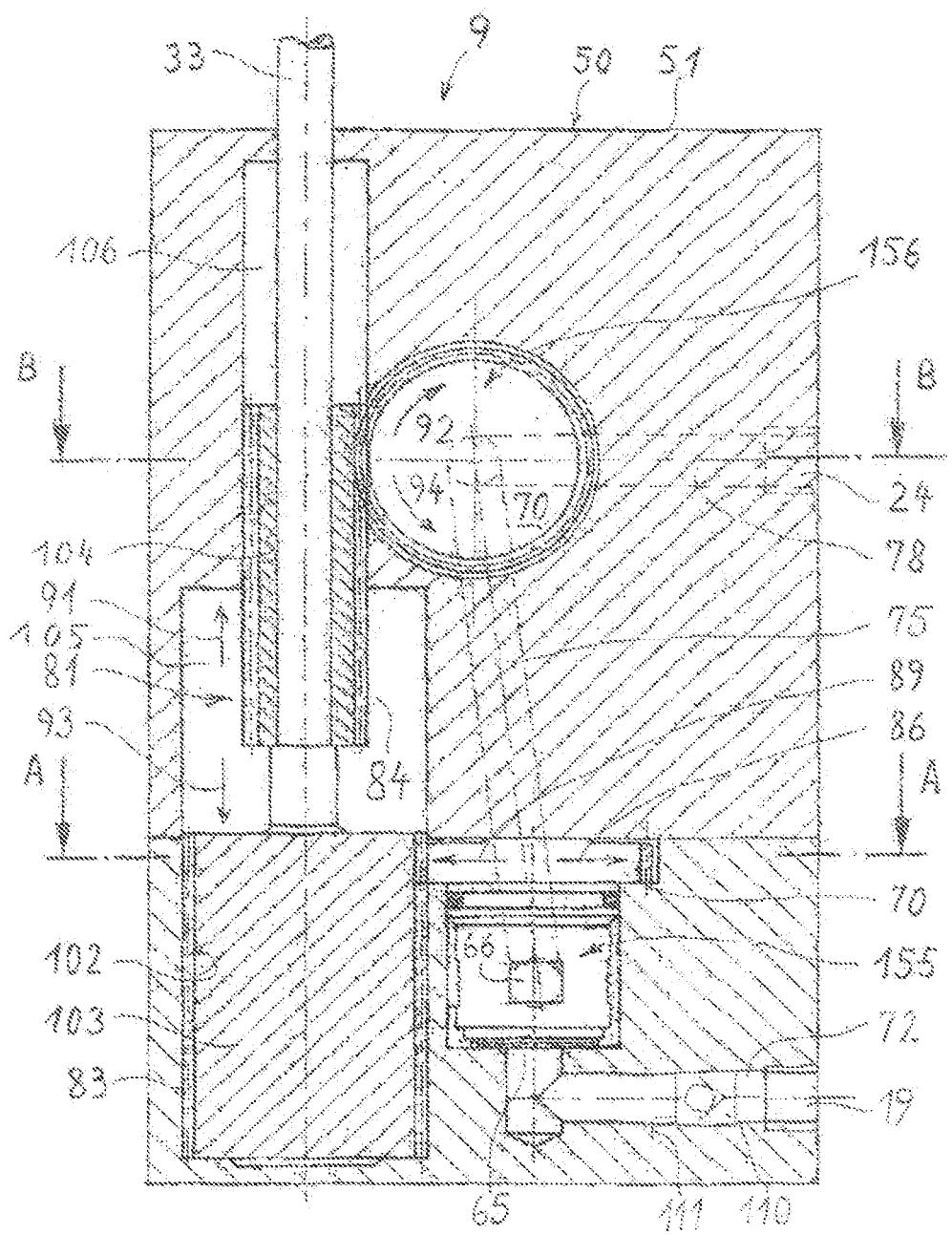
Figure 13:
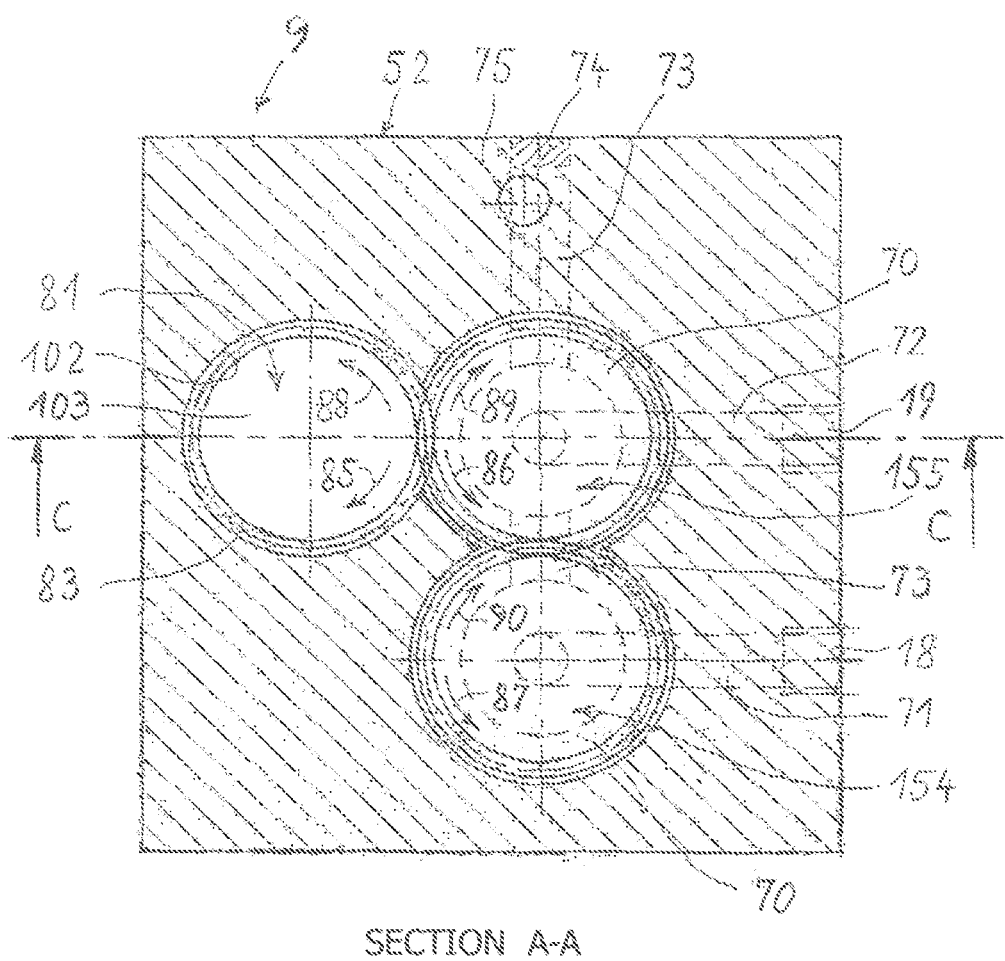
Figure 14:
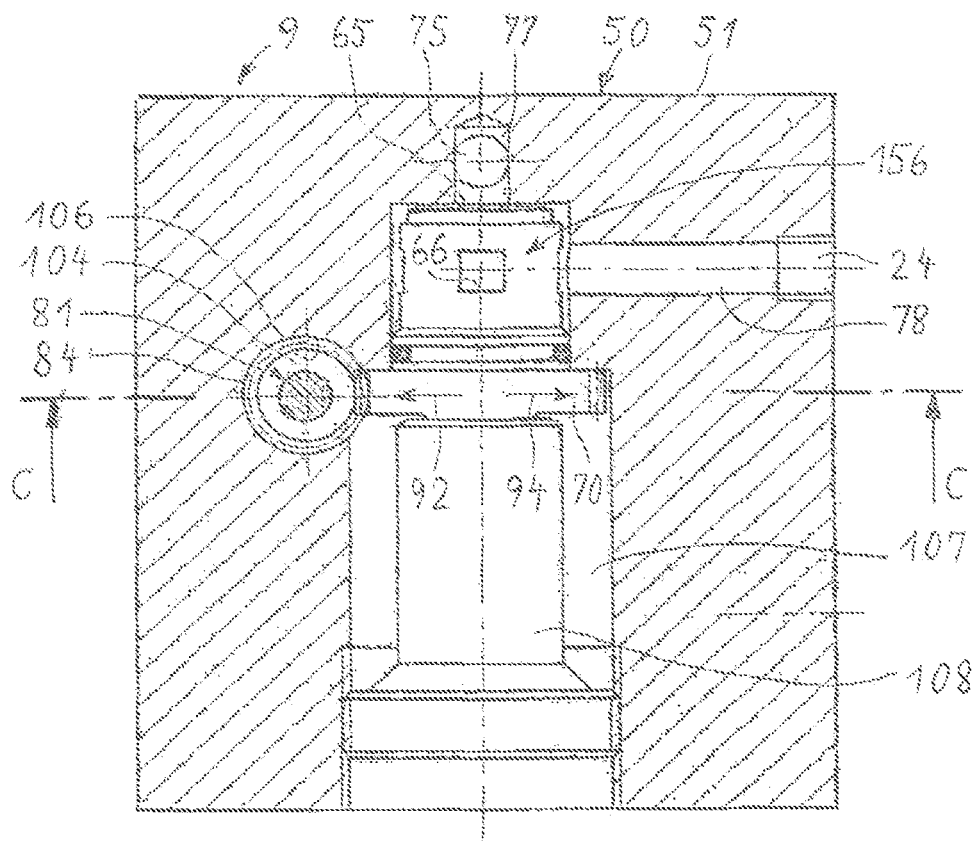
Figure 15:
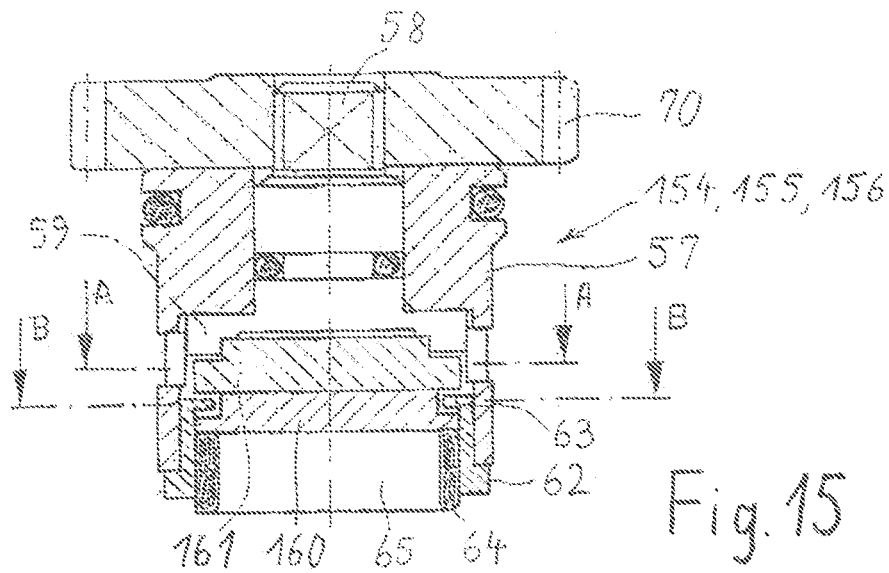
Figure 16:
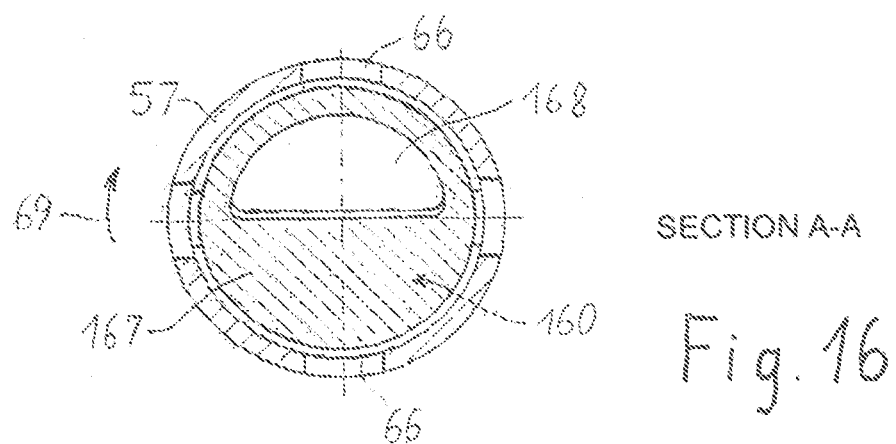
Figure 17:
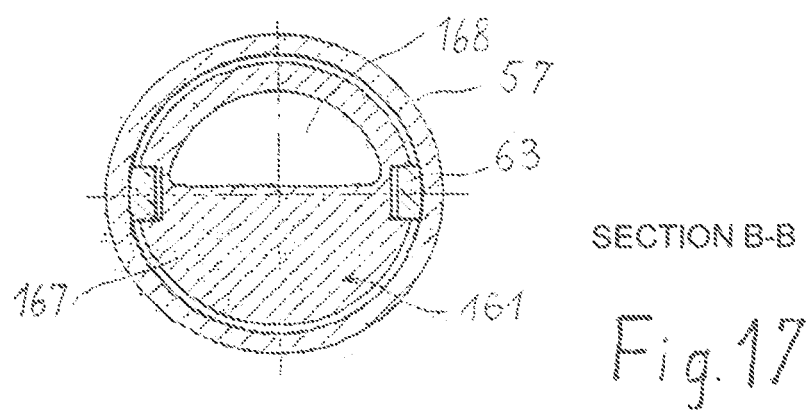
Figure 18:
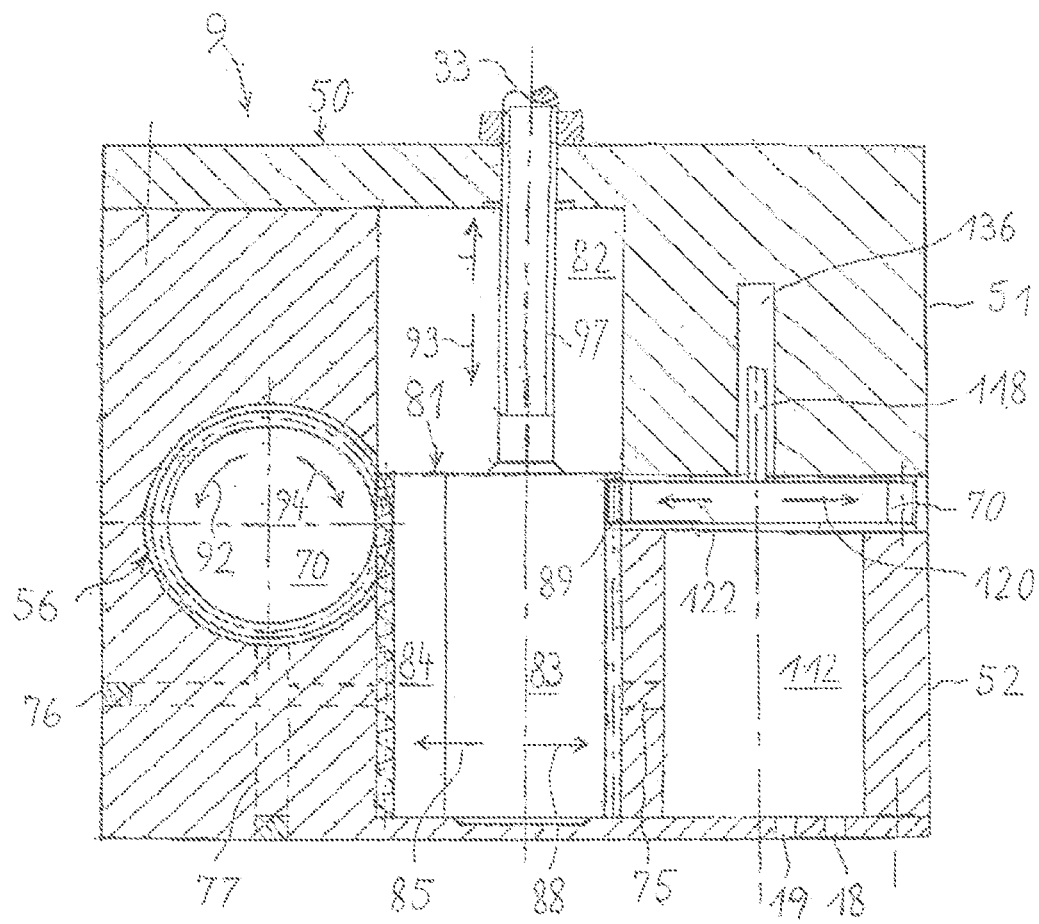
Figure 19:
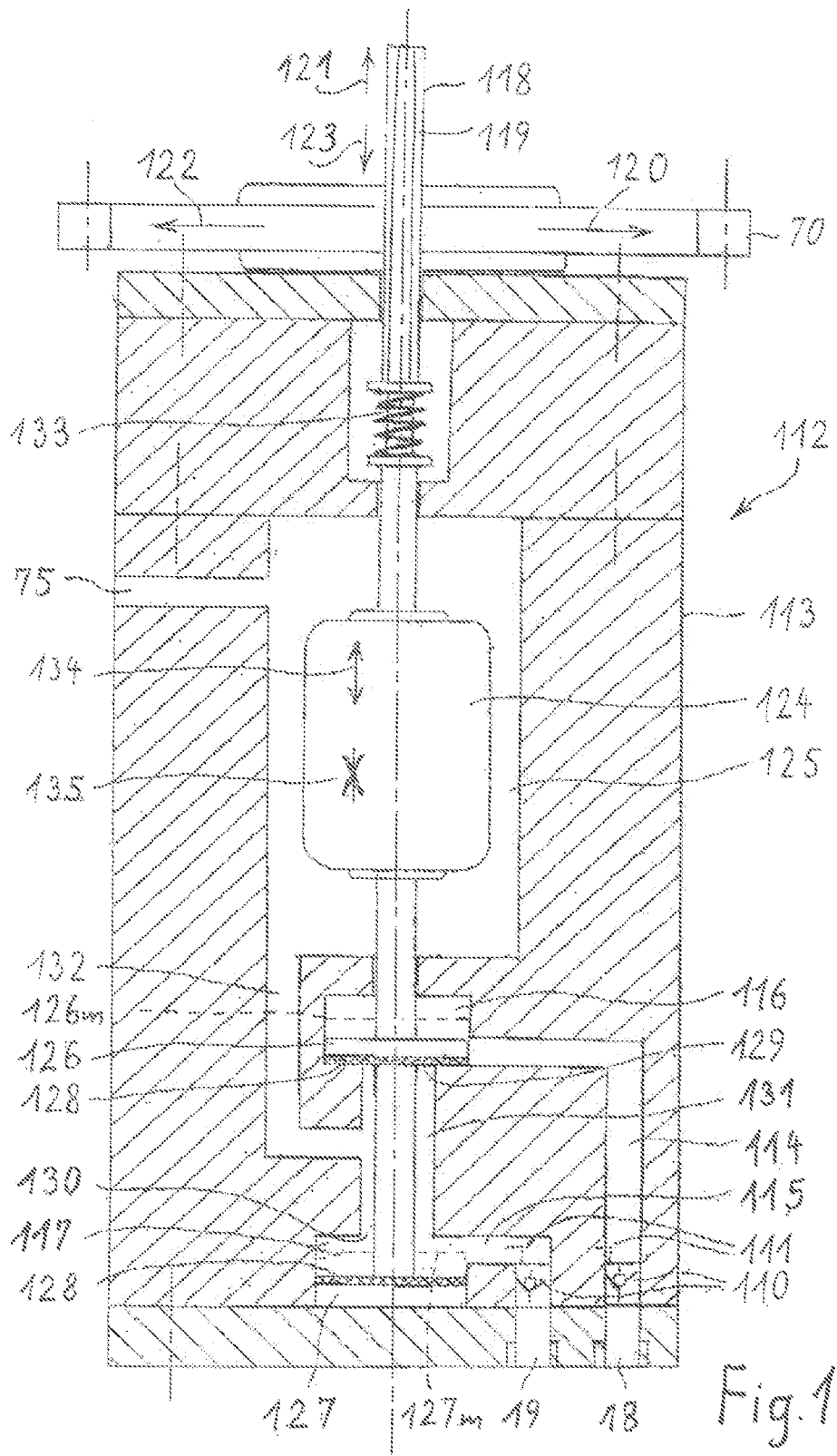
Figure 20:
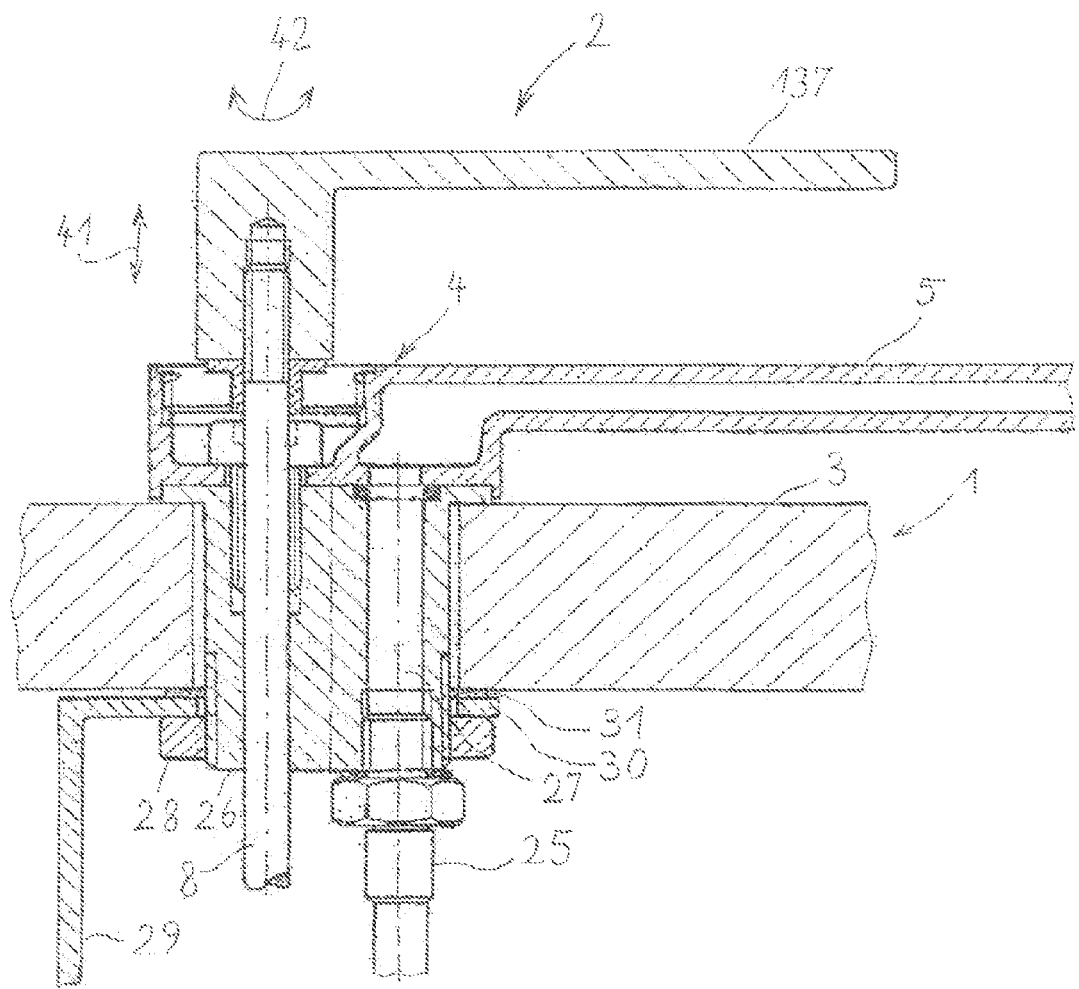

The invention is explained in greater detail with reference to embodiments. In the drawings:

FIG. 1 is a schematic illustration of a sanitary device having a water fitting in order to explain the construction and function of a single-lever mixing gear according to the invention which is arranged directly below the fitting member, FIG. 2 shows a single-lever mixing gear which is secured to the well of the room below the sanitary device and which is connected to the device for actuating the single-lever mixing gear by means of a flexible shaft, FIG. 3 is a cross-section of the outlet of the fitting member in the sanitary device at the level of the device for actuating the single lever mixing gear, FIG. 4 is a view of the housing of a first embodiment of a single-lever mixing gear with the indicated plane of section G-H-D-I illustrated in FIG. 8, FIG. 5 is a sectional view of a first construction type of a blocking member of the single-lever mixing gear, FIG. 6 is the view of the plane of section A-A through the control plate, FIG. 7 is a view of the plane of section B-B through the base plate, FIG. 8 is a view of the plane of section G-H-D-I through the first construction type of the single-lever mixing gear, FIG. 9 is a view of the plane of section J-K-L-M through the single-lever mixing gear, FIG. 10 is a view of the plane of section C-D-E-F through the single-lever mixing gear, FIG. 11 is a view of the plane of section N-O-P-Q through the single-lever mixing gear, FIG. 12 is a sectional view of another embodiment of a single-lever mixing gear in accordance with the plane of section CC indicated in FIG. 1, FIG. 13 is a view of the plane of section A-A through the single-lever mixing gear indicated in FIG. 12, FIG. 14 is a view of the plane of section B-B through the single-lever mixing gear indicated in FIG. 12, FIG. 15 is a sectional view of a second construction type of a blocking member of the single lever mixing gear, FIG. 16 is a view of the plane of section A-A through the control plate, FIG. 17 is a view of the plane of section B-B through the base plate, FIG. 18 is a view of the plane of section through another embodiment of a single-lever mixing gear which corresponds to the first construction type, as illustrated in FIG. 9, with blocking members controlled by thermostat, FIG. 19 shows an actuation member with a blocking function in the single-lever mixing gear according to FIG. 18 and FIG. 20 shows an embodiment of a fitting member of a water fitting without a cartridge.

There is illustrated in FIG. 1 as a sanitary device a wash stand 1 which is provided with a water fitting 2. The fitting member 4 of the water fitting 2 is positioned on the upper side 3 of the wash stand 1. The outlet 5 opens into the basin 6 of the wash stand 1, whilst the actuation lever 7 is connected to the single-lever mixing gear 9 according to the invention by means of a connecting rod 8. Another rod 10 serves to actuate the closure member 11 in the drain 12 of the basin 6. The rod 10 is connected by means of an articulation 13 to another rod 14 via which the closure member 11 is raised in order to open the drain 12 and lowered to close it if the protrusion 15 at the end of the rod 10 protruding beyond the wash stand 1 is pressed or pulled, as indicated with the double-headed arrow 16. The drain 12 is opened in the illustration.

The single-lever mixing gear 9 according to the invention is arranged at the lower side 17 of the wash stand 1, in a state separated from the fitting member 4 by the wash stand 1. The hot-water supply flow 18 and the cold-water supply flow 19 which are connected to the pipes of the domestic supply system via pipes 20 and 21 via the isolating valves 22 and 23 which are located one behind the other in this instance, respectively, are connected to the single-lever mixing gear 9. The mixed water outlet 24 of the single-lever mixing gear 9 (hidden in this instance) is connected to the outlet 5 of the fitting member 4 via a pipe 25.

The fitting member 4 of the water fitting 2 which is arranged at the upper side 3 of the wash stand 1 extends with a has 26 through the wash stand 1 at the lower side 17 thereof. The connecting rod 8 for actuating the single-lever mixing gear 9 extends through the base 26 and the supply pipe 27 extends to the outlet 5. The pipe 25 which comes from the mixed water outlet 24 of the single-lever mixing gear is connected to the supply pipe 27. The base 26 carries an out thread at its end and is secured to the wash stand 1 with a nut 28.

The single-lever mixing gear 9 is secured with a U-shaped connecting portion 29 to the wash stand or, as shown in this embodiment, to the base 26 of the fitting member 4 of the water fitting 2. To this end, the upper member 30 of the U-shaped connecting portion 29 is clamped between the nut 28 and the wash stand 1. A seal 31, for example of rubber, located between the member 30 and the wash stand 1 ensures sealing and reduction of tension. The single-lever mixing gear 9 is secured to the lower member 32 of the connecting portion 29. By means of auxiliary positioning means which are not illustrated in this instance, for example a tongue which extends into the opening of the member 30 which receives the base 26 and a corresponding groove in the base 26, it is possible to ensure positionally correct installation and prevent torsion of the single-lever mixing gear during operation.

The single-lever mixing gear 9 is positioned under the fitting member 4 of the water fitting 2 in such a manner that it is possible to bring about direct perpendicular connection of the connecting rod 8 connected to the actuation lever 7 with respect to the pin 33 for actuating the single-lever mixing gear 9. It is thereby possible to directly transmit the movements of the actuation lever 7 to the pin 33 by means of the connecting rod 8. The pin 33 is connected to the connecting rod 8 in accordance with the length of the connecting rod 8. The connecting rod 8 is introduced, for example, into the hollow pin 33 and connected thereto with a split pin 34 which is inserted through a hole in the pin and a hole which corresponds thereto in the connecting rod 8 and which is one of a plurality of holes in the connecting rod arranged one above the other.

The actuation lever 7 of the fitting member 4 is secured for the pivot movement, as indicated by the double-headed arrow 35, in an articulation 36 to a terminal portion 37 which terminates the pipe 38 in which the connecting rod 8 is guided in order to actuate the single-lever mixing gear 9. If the actuation lever 7 is raised, the end 39 of the connecting rod 8 is carried in the guiding slot 40 in the actuation lever 7 and the connecting rod 8 is pulled upwards, whereby the supply flows 18 and/or 19 are opened so that water flows from the outlet 5. If the actuation lever 7 is lowered, the supply flows are closed. The upward and downward movement of the connecting rod 8 is indicated by the double-headed arrow 41. If the actuation lever 7 is pivoted with the terminal portion 37 which is rotatably supported on the pipe 38, as indicated by the double-headed arrow 42, the cold and hot water streams are accordingly mixed together in the single-lever mixing gear 9 so that water with the mixing temperature corresponding to the position flows from the outlet 5.

Another solution by means of which the opening, closing and mixing movements of a device for actuating the single-lever mixing gear on the fitting member are transmitted to the single-lever mixing gear is illustrated in FIG. 2. The features which correspond to the previous embodiment in FIG. 1 are given the same reference numerals.

In the present embodiment, the movement transmission from an actuation handle 43 is carried out by means of a helix member having a flexible shaft 44 to the pin 33 in order to actuate the single-lever mixing gear 9. Using a helix member having a flexible shaft, it is possible to transmit the opening, closing and mixing movements even when the actuation handle and the single-lever mixing gear are arranged offset relative to each other. The actuation handle 43 is supported pivotably, as indicated by the double-headed arrow 45, and movably, as indicated by the double-headed arrow 46, in the outlet 5 which also contains the water supply pipe 27.

FIG. 3, a sectioned illustration perpendicular relative to the viewing plane in FIG. 2, as indicated by the plane of section A-B, illustrates that the helix member having a flexible shaft 44 is supported in a tubular guide 47 in the outlet 5. The actuation handle 43 can be pivoted and moved in a wedge-shaped slot 48 in the rear of the outlet 5 in order to actuate the single-lever mixing gear 9. The slot 48 is protected from contamination by water and cleaning agents by means of a cover 49.

FIG. 4 schematically illustrates a first embodiment of a single-lever mixing gear 9. In the present embodiment, a parallelepipedal housing 50 contains the functional elements illustrated in the following Figures. In accordance with the type of fixing provided, the housing may contain correspondingly arranged threaded bores or other fixing elements, which is not illustrated in this instance. The housing 50 may comprise any suitable metal material or plastics material and may be a processed block or an injection-moulding component. The supply flow 18 of the hot water and the supply flow 19 of the cold water, the mixed water outlet 24 and the pin 33 for direct manual actuation of the single-lever mixing gear are indicated. The housing 50 is divided into two portions in order to allow the installation of the functional elements necessary for the function of the single-lever mixing gear, an upper portion 51 and a lower portion 52. In order to facilitate the installation of the functional elements, the separation plane 53 extends in accordance with their arrangement, in this instance with a shoulder. The connection of the upper portion 51 to the lower portion 52 may be carried out, for example, conventionally by means of a screw type connection, which is not illustrated in this instance.

A plane of section through the housing 50 of the single-lever mixing gear 9 is designated. G-H-D-I and is illustrated in FIG. 8.

The subsequent FIGS. 5 to 7 show the construction of a first construction type of one of the three blocking members in the single-lever mixing gear 9. As can be seen in FIG. 8, three commercially available blocking members are used in the single-lever mixing gear 9 of the first embodiment, a blocking member 54 in the hot-water supply flow 18, a blocking member 55 in the cold-water supply flow 19 and a blocking member 56 in the mixed water outlet 24 acting as a blocking member and for controlling the quantity.

FIG. 5 is a cross-section of one of the blocking members of a first construction type. There is supported in a housing 57 a spindle 58 which engages by means of carriers 59 in a control plate 60 of ceramic material. That plate covers a base plate 51 which is introduced into the housing 57 by means of a socket 62 having retention cams 63. An annular seal 64 which is inserted into the socket 62 supports the base plate 61 and seals the supply flow opening 65 with respect to a connected pipe. When the blocking member is open, the water flows through one or more facing outlet openings 66 out of the housing 57, which contains four outlet openings 66 in this instance.

Section A-A in FIG. 5 extends through the control plate 60 and is illustrated in FIG. 6. Section B-B in FIG. 5 extends through the base plate 61 and is illustrated in FIG. 7. The control plate 60 comprises two opposing segments 67 and the base plate 61 has two opposing openings 68. As can be seen from the two Figures, the blocking member is open. In FIG. 6, the control plate 60 is positioned in such a manner that its segments 67 release the openings 68 of the base plate 61. By means of a rotation through 90 angular degrees, for example in the direction of arrow 69, the blocking member can be closed because the two segments 67 cover the openings 68 in that position.

A toothed wheel 70 is positioned on the spindle 58. The spindle 58 is rotated or opening and closing by drives which are described below.

The following Figures are sections through the housing 50 of the single-lever mixing gear 9 of the first embodiment, in which the arrangement of the functional elements necessary for the function of the single-lever mixing gear can be seen.

FIG. 8 is a view of the plane of section G-H-D-I through the housing 50 illustrated in FIG. 4. From the right, the hot-water supply flow 18 is in the lower portion and the cold-water supply flow 19 is above. In this embodiment, all the water pipes for the individual functional elements are in the form of bores. In other constructions of the housing, they may also be tubes. The water flows via the bores 71 and 72 to the blocking members 54 and 55 which are introduced into the lower portion 52, respectively. A bore 73, formed in the housing 50 from the outer side and closed with a stopper 74 at the outlet out of the housing, connects the outflow openings 66 of the two blocking members 54 and 55 and connects the outflow openings 66 of the blocking member 54 to another bore 75 which directs the water to the blocking member 56, the blocking member for blocking and controlling the water quantity, which is arranged perpendicularly to the two blocking members 54 and 55. However, the blocking member 55 can also be connected to the blocking member 56 by means of a differently directed bore 75. The bore 75 which is also formed in the housing 50 from the outer side is closed with a stopper 76 at the outlet from the housing. A bore 77 which branches off from the bore 75 leads to the supply flow opening 65 of the blocking member 56 and from the outflow openings 66 thereof to the bore 78 which constitutes the mixed water outlet 24 of the single-lever mixing gear 9 is connected to the outlet of the water fitting.

The blocking member 56 is introduced into a bore 79 of the housing 50 and is fixed in its position by a closure member 80 which is screwed into that bore 79.

In the present embodiment, the actuation of the blocking members 54, 55 and 56 of the single-lever mixing gear 9 is carried out manually. An actuation spindle 81 is arranged centrally in the housing 50 in the single-lever mixing gear 9. The pin 33 connected thereto is connected, for example, by means of a connecting rod 8 (FIGS. 1, 20) or a helix member having a flexible shaft 44 (FIG. 2). When the actuation lever 7 or 137 or the actuation handle 43 is actuated, the actuation spindle 81 is raised or lowered or pivoted and transmits those movements to the blocking members.

A toothed wheel 70 is secured to the spindles 58 of the blocking members 54, 55 and 56, respectively. The actuation spindle 81 is introduced into a correspondingly formed bore 82 in the housing 50. The actuation spindle 81 is a cylindrical member which has a tooth arrangement which is rotated through 90 angular degrees at opposite sides. The tooth arrangement 83 which is in engagement with the toothed wheels 70 of the two blocking members 54 and 56, the blocking members of the supply flows, extends in the manner of a toothed wheel over the entire height of the cylindrical member as illustrated in FIG. 9. The toothed wheel 84 which is in engagement with the toothed wheel 70 of the blocking member 56, the blocking member for the quantity limitation, is formed in the manner of a curved toothed rod. If the actuation spindle 81 is rotated owing to a pivot movement 42 of the actuation lever 7 or 137 (FIG. 1) or a pivot movement 45 of the actuation handle 43 (FIG. 2), this rotational movement is transmitted to the two toothed wheels 70 of the spindles 58 of the blocking members 54 and 55 whilst the toothed wheel 70 of the blocking member 56 is not moved.

In FIG. 8, if a central position of the actuation lever 7 or 137 or the actuation handle 43 is taken as a basis and if the actuation spindle 81 is rotated in the direction of arrow 85 in order to increase the quantity of hot water, the toothed wheel 70 of the blocking member 55 in the cold water supply flow 19 is rotated in the direction of arrow 86 and is increasingly closed until the water is stopped. The toothed wheel 70 of the blocking member 54 in the hot-water supply flow 18 is rotated in the direction of arrow 87 and increasingly opens the blocking member 54 until it is completely open.

If a central position of the actuation lever 7 or 237 or the actuation handle 43 is taken as a basis and if the actuation spindle 81 is rotated in the direction of arrow 88 in order to increase the cold water quantity, the toothed wheel 70 of the blocking member 55 in the cold-water supply flow 19 is rotated in the direction of arrow 89 and is increasingly opened until it is completely open. The toothed wheel 70 of the blocking member 54 in the hot-water supply flow 18 is rotated in the direction of arrow 90 and increasingly closes the blocking member 54 until it is completely closed.

A prerequisite for those described opening and closing operations of the blocking members is that both fulfill opposing functions with the same direction of rotation of the spindle. If the toothed wheel 70 and therefore the spindle 58 of the blocking member 55 is rotated by the actuation spindle 81 in the direction of arrow 89, the blocking member 55 is opened. That blocking member is closed by the spindle 58 of the blocking member 54 being simultaneously rotated in the direction of arrow 90.

As can be seen from the description, both the blocking member 54 and the blocking member 55 are partially opened at a central position of the actuation lever 7 or 137 or the actuation handle 43. The two blocking members are connected via the bore 73. When the blocking member 56 is closed, it could be the case that water flows from the supply flow with the higher pressure to the supply flow with the lower pressure in the event of different pressure in the hot-water supply flow 18 and the cold-water supply flow 19. In order to prevent that, a non-return valve is fitted in the bore 71 of the hot-water supply flow 18 and in the bore 72 of the cold-water supply flow 19, respectively, as indicated by the symbol 110. If water attempts to flow from one supply flow to the other supply flow, the non-return valve being acted on automatically closes. The non-return valves 110 can even be controlled electrically with appropriate equipment, as indicated in the symbol corresponding to reference numeral 111. For instance, the non-return valves 110 can be controlled when the actuation lever 7 or the actuation handle 43 is in a completely closed position and therefore the blocking member 56 in the mixed water outlet 24 is closed in such a manner that opening is prevented in each case and the non return valves 110 are only released if the blocking member 56 is opened.

The water quantity from zero up to maximum flow is controlled by the blocking member 56. If the actuation lever 7 is lifted from the closed position in the direction of arrow 35 (FIG. 1) and the actuation lever 137 is lifted in the direction of arrow 41 (FIG. 20) or the actuation handle 43 is pulled forwards in the direction of arrow 46 (FIG. 2), the actuation spindle 81 is lifted in the direction of the viewer in FIG. 8 and in the direction of arrow 91 in FIG. 9. Owing to the tooth arrangement 84, in the form of a toothed rod, the toothed wheel 70 of the blocking member 56 is rotated in the direction of arrow 92 and the blocking member 56 is increasingly opened until it is completely open and the maximum quantity of mixed water is reached.

If actuation lever 7 is lowered in the direction of arrow 35 (FIG. 1) and the actuation lever 137 is lowered in the direction of arrow 41 (FIG. 20) from the completely opened position of the blocking member 56 or if the actuation handle 43 is pushed backwards in the direction of arrow 46 (FIG. 2), the actuation spindle 81 is lowered in FIG. 8 away from the viewer and lowered into the position indicated in FIG. 9 in the direction of arrow 93. The toothed wheel 70 of the blocking member 56 is rotated in the direction of arrow 94 and the blocking member 56 is increasingly closed until the water is stopped. The blocking members 54 and 55 are not actuated owing to the different tooth arrangement of the actuation spindle 81 both when the blocking member 56 is exclusively opened and when it is exclusively closed.

When the blocking members 54, 55 and 56 are actuated with motors, the mechanical construction of the single-lever mixing gear becomes substantially simpler. The actuation spindle 81 with its tooth arrangements would then be superfluous. In place of the closure member 80, a motor would be positioned directly on the spindle of the blocking member 56 for limiting the quantity. The toothed wheel 70 is unnecessary. The toothed wheel 70 of the blocking member 54 in the hot-water supply flow 18 and the toothed wheel 70 of the blocking member 55 in the cold-water supply flow 19 would be brought into engagement and a motor would be positioned on one of the spindles of those blocking members. That motor would actuate the spindle of one blocking member, for example open it and close the other blocking member accordingly in the opposite direction via the toothed wheel connection.

FIG. 9 is a view of the plane of section J-K-L-M indicated in FIG. 8. The actuation spindle 81 is in the closed position, that is to say, the blocking member 56 in the mixed water outlet 24 is closed, and in the central position which relates to mixing the hot water and cold water streams. As can be seen, the toothed-wheel-like tooth arrangement comprises the indicated region 83 of the cylindrical member and the toothed-rod-like tooth arrangement comprises the indicated region 84 of the actuation spindle 81. During rotational movements about the individual axis, only the toothed wheels 70 of the blocking members 54 and 55 are rotated and those blocking members are opened or closed whilst the toothed wheel 70 of the blocking member 56 is not moved, owing to the toothed-rod-like tooth arrangement 84.

If the actuation spindle 81 is lifted in the direction of arrow 91, the toothed wheel 70 of the blocking member 56 is rotated in the direction of arrow 92 by means of the toothed-rod-like tooth arrangement 84 and the blocking member is opened. The lifting height of the actuation spindle 81 and therefore the quantity of mixed water from the single-lever mixing gear can be mechanically limited if, as indicated here, it is possible to introduce protruding pins 95 into holes arranged one above the other in the wall of the bore 82 or to screw in screws.

A comparable possibility of limiting the water streams which flow out of the blocking member 54 in the hot-water supply flow 18 or the blocking member 55 in the cold-water supply flow 19 is also illustrated in FIG. 9 and as a plan view in FIG. 4. An indicator-like bar 96 is arranged for movement on the pin 33 which projects out of the single-lever mixing gear 9 and is connected to the actuation spindle 81 so that it is carried only in the event of rotational movements of the actuation spindle 81

To this end, for example, a toothed-wheel-like tooth arrangement 97 may be provided on the periphery of the pin 33. In the pivot range of the indicator 96, for example, there may be provided at the upper side of the single-lever mixing gear 9 holes 98 into which pins 99 can be introduced or screws can be screwed in order to limit the angle about which the actuation spindle 81 can be rotated.

FIG. 4 illustrates an arrangement for limiting the pivot range of the actuation spindle 81. The actuation spindle 81 is in the central position so that the two blocking members 54 and 55 are opened to the same extent. The rotation angle 100 for opening the blocking member 54 for the hot-water supply flow 18 is stopped by a pin 99 at an early stage in order to limit the volume flow of the hot-water supply flow, whereby it is possible to prevent scalding with excessively hot water. However, the rotation angle 101 for the cold-water supply flow 19 via the blocking member 55 is greater. As thereby indicated, by changing the rotation angles of the actuation spindle 81 the maximum and minimum temperature of the water can be individually controlled at the outlet if the temperatures and pressures of the water remain constant in the supply flows.

FIG. 10 is a view of the plane of section C-D-E-F, as indicated in FIG. 9. The section shows the blocking member 54 in the hot-water supply flow, bore 71, and the blocking member 55 in the cold-water supply flow, bore 72. The actuation spindle 81 of the two blocking members is in the closure position and cannot therefore be seen.

In FIG. 11, it is possible to follow the path of the water through the bores in the lower portion 52 of the housing 50 with reference to the plane of section N-O-P-Q, from the hot-water supply flow 18 via the bores 73, 75 and 77 as far as the blocking member 56 in the mixed water outlet, the blocking member for blocking and controlling the quantity of water.

FIG. 12 shows a single-lever mixing gear 9 which has a structure which is different from the preceding embodiment according to FIGS. 8 to 11. The blocking members for the hot and cold-water supply flows and the blocking member for the mixed water outlet are arranged one above the other, whereby other possibilities for installation are developed. Features corresponding to the preceding embodiment are given the same reference numerals. The blocking members are actuated in this instance with an actuation spindle having a different construction from the preceding embodiment.

FIG. 12 is a longitudinal section through the single-lever mixing gear 9, along the actuation spindle 81, as designated C-C in FIGS. 13 and 14. The actuation ranges of the actuation spindle 81, the tooth arrangement 83 for actuating the blocking members 154 and 155 in the supply flows 18 and 19 and the toothed rod 84 for actuating the blocking member 156 in the mixed water outlet 24 are no longer on one and the same roller member but are instead arranged one above the other and separately from each other. It is thereby possible to have substantially greater pivot angles for opening and closing the blocking members in the supply flows. It is thereby possible to control the water quantity and the mixing temperature with substantially finer steps. Therefore, the openings in the base plate and in the control plate in the blocking members of the supply flows and the mixed water outlet are constructed differently from the blocking member illustrated in FIGS. 5 to 7. FIGS. 15, 16 and 17 illustrate such a blocking member and the base plates and control plates contained therein.

In the present embodiment, the blocking members 154, 155 and 156 of the single-lever mixing gear 9 are also actuated manually. The pin 33 connected to the actuation spindle 81 is directly connected, for example, to a connecting rod 8 (FIG. 1) or to a helix member having a flexible shaft 44 (FIG. 2) or to the actuation lever of a water fitting (FIG. 20). When the actuation lever 7 or 137 or the actuation handle 43 is actuated, the actuation spindle 81 is lifted, as indicated by the arrow 91, or lowered or pivoted, as indicated by the arrow 93, and transmits those movements to the blocking members.

The housing 50 of the single-lever mixing gear 9 is also divided into two. The blocking members 154 and 155 are arranged in the lower portion 52 and the actuation element 103 which has a toothed-wheel-like tooth arrangement 83 and which is in engagement with the toothed wheel 70 on the blocking member 155 is arranged in a bore 102. The toothed wheel 70 on the blocking member 155 is in engagement with the toothed wheel 70 on the blocking member 154. The described arrangement of the functional elements mentioned can be seen in FIG. 13 which is a view of the plane of section A-A indicated in FIG. 12. By the separation of the tooth arrangements 83 and 84, it is possible to substantially increase the pivot range of the toothed-wheel-like tooth arrangement 83 for actuating the blocking members 154 and 155 in the hot-water supply flow 18 or cold-water supply flow 19, for example up to 180 angular degrees.

The increased pivot range allows the operator to adjust the mixing water temperature in a substantially more sensitive manner because the mixing water temperature is changed less powerfully in the case of a larger rotation angle of the actuation spindle. In the sanitary sector, reference is made to a "comfort zone" in relation to this adjustment possibility. The same effect can also be achieved by changing the reference diameter of the tooth arrangement 83 which is in engagement with the toothed wheels 70 of the blocking members 154 and 155.

If the reference diameter of the tooth arrangement 83 is reduced in comparison with the reference diameter of the toothed wheels 70 of the blocking members 154 and 155, the rotation angle at the pin 33 to completely close or open the blocking members becomes greater.

Changing the reference diameters in that manner with the corresponding effects is also possible in the embodiment according to FIGS. 8 to 11.

In FIG. 13, from the right, the hot-water supply flow 18 is in the lower portion and the cold-water supply flow 19 is above. In this embodiment, all the water pipes for the individual functional elements are also in the form of bores. The water flows to the blocking members 154 and 155 via the bores 71 and 72, respectively. In order also to prevent in this embodiment water flowing from the supply flow with the higher pressure to the supply flow with the lower pressure in the case of different pressures in the hot-water supply flow 18 and in the cold-water supply flow 19, a non-return valve is fitted in the bore 71 of the hot-water supply flow 18 and in the bore 72 of the cold-water supply flow 19, respectively, as indicated by the symbol 110. Corresponding control is also possible in this instance, as indicated by the symbol 11 and as described in the preceding embodiment.

A bore 73 which is formed in the housing 50 from the outer side and which is closed with a stopper 74 at the outlet from the housing connects the outflow openings of the two blocking members 154 and 155 and connects the outflow openings of the blocking member 155 to another bore 75 which directs the water to the blocking member 156, the blocking member for blocking and controlling the water quantity, which is arranged in the upper portion 51 perpendicularly relative to the two blocking members 154 and 155 and above them, as indicated in FIG. 12. However, the blocking member 154 can also be connected to the blocking member 156 via a bore 75 which is orientated differently.

The blocking member 156 is arranged in the upper portion 51 of the housing 50. It is actuated with the actuation element 104 having the toothed-rod-like tooth arrangement 84 which is in engagement with the toothed wheel 70 on the blocking member 156. If the actuation element 104 is lifted in the direction of arrow 91 the toothed wheel 70 is rotated in the direction of arrow 92 and the blocking member 156 is opened; in the event of lowering in the direction of arrow 93, the toothed wheel 70 is rotated in the direction of arrow 94 and the blocking member 156 is closed.

The toothed-rod-like tooth arrangement 84 of the actuation element 104 of the actuation spindle 81 completely surrounds the extended pin 33. The actuation element 103 having the toothed-wheel-like tooth arrangement 83 must have the same length as the toothed-rod-like tooth arrangement 84 of the actuation element 104 whose length is dependent on the lifting of the device for actuating the single-lever mixing gear. So that the actuation elements 103 and 104 can be lifted into the upper portion 51 of the housing 50 when the actuation spindle is lifted in the direction of arrow 91, correspondingly formed bores 105 and 106 are provided at that location, respectively.

FIG. 14 is a view of the section B-B in the region of the blocking member 156 in the mixed water outlet 24 of the single-lever mixing gear 9. A bore 77 which branches off from the bore 75 leads to the supply flow opening 65 of the blocking member 156 and from the outflow openings 66 thereof into the bore 78 which opens in the mixed water outlet 24 of the single-lever mixing gear 9 which is connected to the outlet of the water fitting which is not illustrated in this instance.

The blocking member 156 is introduced into a bore 107 of the upper portion 51 of the housing 50 and is fixed in its position by a closure member 108 which is screwed into that bore 107.

When the blocking members 154, 155 and 156 are actuated with motors, the mechanical construction of the single-lever mixing gear becomes substantially simpler, as already described in the preceding embodiment. The actuation spindle 81 with its tooth arrangements would then be superfluous. In place of the closure member 108, a motor would be positioned directly on the spindle of the blocking member 156 for limiting the quantity. The toothed wheel 70 is unnecessary. The toothed wheel 70 of the blocking member 154 in the hot-water supply flow 18 and the toothed wheel 70 of the blocking member 155 in the cold-water supply flow 19 would be brought into engagement and a motor would be positioned on one of the spindles of those blocking members. That motor would actuate the spindle of one blocking member, for example open it, and close the other blocking member accordingly in the opposite direction via the toothed wheel connection.

FIG. 15 is a cross-section of one of the blocking members 154, 155 and 156 of the second construction type. Owing to their larger openings in the control plate and base plate, that construction type is particularly suitable for a single-lever mixing gear of the last embodiment mentioned with increased pivot ranges for the blocking members. The functional elements that are identical to the blocking member of the first construction type are referred to with the same reference numerals as in FIGS. 5 to 7. A spindle 58 is supported in a housing 57. The toothed wheel 70 for opening and closing the blocking member is positioned on the spindle 58. The carriers 59 connected to the spindle 58 engage in a control plate 160 of ceramic material. That plate covers a base plate 161 which is introduced into the housing 57 by means of a sleeve 62 having retention cams 63. An annular seal 64 which is introduced into the sleeve 62 supports the base plate 161 and seals the supply flow opening 65 with respect to a connected pipe. When the blocking member is open, the water flows through four facing outflow openings 66 out of the housing 57.

The section A-A in FIG. 15 extends through the control plate 160 and is illustrated in FIG. 16. The section B-B in FIG. 15 extends through the base plate 161 and is illustrated in FIG. 17. The control plate 160 and the base plate 161 have a corresponding shape. Both plates are divided into two segments of identical size. Whereas one segment 167 is closed, the other segment has an opening 168 which extends over 180 angular degrees. As can be seen from the two FIGS. 16 and 17, the blocking member is open. By being rotated through 180 angular degrees, for example in the direction of arrow 69, the blocking member can be closed. In that end position, the segment 167 of the control plate 160 covers the opening 168 in the base plate 161, in the construction type of the blocking member illustrated in FIGS. 5 to 7, the two openings 68 in the base plate 61 also produce an opening which extends in total over 180 angular degrees. Since the opening are each divided into segments of 90 angular degrees however, both openings are simultaneously closed during the closure operation and they are already closed after a pivot movement of 90 angular degrees. The quantity control and the mixing temperature control are thereby coarser than in the present construction type because the range in which control is possible is doubled in the latter.

It is known in the prior art to provide water fittings with thermostat control. After adjusting a mixing water temperature on a temperature scale on the water fitting, water at the previously adjusted temperature always flows when the water fitting is opened. In the case of the water quantity removed being changed, pressure fluctuations, fluctuations in the water quantity and changes in the temperature in the supply flows, the mixing water temperature is brought back to the desired value by corresponding interventions in the hot water or cold-water supply flow.

The embodiment of a single-lever mixing gear 9 described below and illustrated in FIG. 18 corresponds in terms of the basic structure to what is illustrated in FIGS. 8 to 11. FIG. 18 corresponds to the illustration in FIG. 9 which sets out the section J-K-L-M through the single-lever mixing gear in FIG. 8. Features corresponding to that embodiment are designated with the same reference numerals. Unlike the preceding embodiment, this is provided with a thermostat-controlled actuation member having a blocking function 112. This means that a blocking member known from the preceding embodiment is not arranged either in the hot-water supply flow 18 or in the cold-water supply flow 19. The blocking members are valve discs in this instance.

The construction of the thermostat-controlled actuation member having a blocking function 112 is explained with reference to FIG. 19 in relation to FIG. 18. This illustration does not correspond to a construction drawing but is instead only intended to make the operation understood. The structure of the actuation member 112 is similar to that of a two-pressure valve. The hot-water supply flow 18 and the cold-water supply flow 19 open into the housing 113. In this instance, a non-return valve 110 having a control 112 is also provided in both supply flows in order to prevent one supply flow from flowing over into the other in an uncontrolled manner. The hot water and cold water are directed into chambers 116 and 117 via bores 114 and 115, respectively. A spindle 118 which is provided with a left-hand thread 119 in the region which protrudes out of the housing 113 extends into the housing 113. A toothed wheel 70 which is in engagement with the tooth arrangement 83 of the adjustment spindle 81 (FIG. 18) is positioned on that spindle 118 in the manner of a nut. If the adjustment spindle 81 is rotated by a pivot, movement of a device for actuating the single-lever mixing gear, the toothed wheel 70 is rotated in the opposite direction of rotation by means of the tooth arrangement 83. Since the toothed wheel 70 is fitted in the housing 50 of the single-lever mixing gear 9 in a fixed manner, the toothed wheel 70 drives the spindle 118 as a nut via the thread 119.

If the device for actuating the single-lever mixing gear of a water fitting is rotated to the left in order to increase the hot-water supply flow, the tooth arrangement 83 is rotated on the adjustment spindle 81 in the direction of arrow 85 and drives the toothed wheel 70 in the direction of arrow 120 and the spindle 118 is lifted out of the housing 113 by means of the left-hand thread in the direction of arrow 121.

If the device for actuating the single-lever mixing gear of a water fitting is rotated to the right in order to increase the cold-water supply flow, the tooth arrangement 83 is rotated on the adjustment spindle 81 in the direction of arrow 88 and drives the toothed wheel 70 in the direction of arrow 122 and the spindle 118 is pushed into the housing 113 in the direction of arrow 123.

A cylindrical expansion member 124 which is securely connected to the spindle at its end faces is introduced into the spindle 118. The expansion member 121 is arranged for free movement in a chamber 125 of the housing 113.

The continuation of the spindle 118 extends out of the chamber 125 through the chamber 115 into the chamber 117. The spindle 118 carries a valve disc 126 in the chamber 116, and a valve disc 127 in the chamber 117. These valve discs are the blocking members of the present embodiment. The valve discs are lined with a seal 128 on their sealing faces. The valve discs 125 and 127 are arranged on the spindle 118 in such a manner that they can alternately close the outflow opening 129 of the chamber 116 and the outflow opening 130 of the chamber 117 into the mixing chamber 131 arranged therebetween. The water streams from the hot-water supply flow 18 and the cold-water supply flow 19 are mixed in the mixing chamber 131 in order to form mixed water having a temperature which is adjusted beforehand at the device for actuating the single-lever mixing gear.

In the present embodiment, the situation is illustrated in which the valve disc 126 in the chamber 116 closes the outflow opening 129 thereof to the mixing chamber 131 and therefore blocks the hot-water supply flow 18. However, the valve disc 127 in the chamber 117 has completely opened the outflow opening 130 to the mixing chamber 131 so that only cold water flows from the cold-water supply flow 19 into the mixing chamber 131. In the maximum position of the device for actuating the single-lever mixing gear for dispensing cold water, the spindle 118 has been completely rotated into the housing 113 in the direction of arrow 123.

In order to mix the cold water with hot water, the outflow opening 129 of the chamber 116 of the hot-water supply flow 18 must be opened. To this end, the spindle 118 must be lifted in the direction of arrow 121. By rotation of the device for actuating the single-lever mixing gear to the left, in the direction for increasing the dispensing of hot water, the adjustment spindle 81 is rotated in the direction of arrow 85, whereby the toothed wheel 70 of the actuation member 112 is rotated in the direction of arrow 120 and the spindle 118 is lifted in the direction of arrow 121 by means of the left-hand thread 119.

If the two valve discs 126 and 127 are located between the opening and closing position in their central position 126m and 127m, respectively, the outflow opening 129 of the chamber 116 and the outflow opening 130 of the chamber 117 into the mixing chamber 131 are opened to the same extent. In the case of an identical supply flow quantity and a constant temperature of the water streams from the hot water supply flow 18 and the cold-water supply flow 19, the quantity and the temperature of the mixed water are constant which is directed via the supply pipe 132 into the chamber 125 in which the expansion member 124 is located before it is directed via the bore 75 to the blocking member 56 in the mixed water outlet 24.

A temperature scale for adjusting the mixing water temperature can be fitted to the water fitting on the device for actuating the single-lever mixing gear in the region of the actuation lever 7 (FIG. 1) or 137 (FIG. 20) or the actuation handle 43 (FIG. 2). If the lever is adjusted to this temperature, the spindle 118 takes up a position with which the two valve discs 126 and 127 are adjusted in such a manner that the water streams from the hot-water supply flow 18 and the cold-water supply flow 19 are mixed together in the mixing chamber 131 in such a manner that the mixing water temperature adjusted at the device for actuating the single-lever mixing gear is reached at the outlet of the fitting member. So that a mixed water stream having the adjusted temperature is produced by the position of the valve discs 126 and 127, there is provided on the spindle 118 an adjustment device 133, at which the precise position of the valve discs can be adjusted before assembly by the spindle being decreased or increased.

If the pressure in one of the supply flows increases, the quantity of incoming water which has a specific temperature changes. The temperature of the mixed water in the mixing chamber 131 is thereby changed. The mixing water temperature also changes owing to a change in the temperature of the incoming water. The mixed water with the changed temperature flows via the supply pipe 132 into the chamber 125 and surrounds the expansion member 124. The expansion member 124 reacts owing to the changed temperature of the mixed water. If the mixed water has an excessively high temperature, the expansion member 124 reacts by means of expansion; it extends, as indicated by the double-headed arrow 134. Since the spindle 118 in the toothed wheel 70 is blocked by the thread 119 against displacement, the spindle 118 is displaced in the chambers 116 and 117 in the direction of arrow 123 and thereby displaces the valve discs 126 and 127. The valve disc 126 is pushed in the direction of the outflow opening 129 of the chamber 116 and thereby brakes the supply flow of hot water into the mixing chamber 131. At the same time, the outflow opening 130 of the chamber 117 is opened further and more cold water flows from the cold-water supply flow 19 into the mixing chamber 131. The mixing water temperature is thereby reduced until the preselected temperature is reached. If the temperature of the mixed water decreases relative to the adjusted value, the expansion member contracts, as indicated by the double-headed arrow 135. The valve discs 126 and 127 are lifted by the spindle 118 in the direction of arrow 121 and the outflow opening 129 is thereby opened further and the outflow opening 130 is thereby closed further. That thermostat control advantageously ensures a constant mixing water temperature at the outlet of the water fitting. In the case of an excessively high mixing water temperature which could result in danger to health or in the event of a failure of the cold-water supply flow, the hot-water supply flow can even be completely blocked. Overheating protection is triggered and the valve disc 126 is pressed into the closed position, for example by a spring in the adjustment device 133.

FIG. 18 shows the actuation member having a blocking function 112, in the state fitted in the single-lever mixing gear 9. The spindle 118 which extends beyond the toothed wheel 70 on the actuation member 112 extends into a bore 136 in the upper portion 51 of the housing 50 and can move up and down at that location in accordance with the adjustment movement thereof.

FIG. 20 illustrates an embodiment for the configuration of a fitting member of a water fitting in a construction which is kept flat. Features which correspond to the water fitting 2 illustrated in FIG. 1 are given the same reference numerals. As can be seen, owing to the lack of a cartridge in the fitting member 4, a very small structural height is possible. The water fitting 2 is also positioned on a sanitary device 1 in this instance. The fitting member 4 comprises only the outlet 5 and an actuation lever 137 which is securely connected to the connecting rod 8 in order to actuate the single-lever mixing gear. The opening of the outlet 5 is not illustrated since its configuration is dependent on whether it extends, for example, into a basin, a bathtub or a bidet.

The single-lever mixing gear, which is not illustrated in this instance, is secured, as in FIG. 1, with a connecting portion 29 to the base 26 of the fitting member 4 which extends through the sanitary device 1.

In contrast to the embodiment according to FIG. 1, in this embodiment of the water fitting 2 the actuation lever 137 is not intended to be tilted in order to adjust the quantity of water. Owing to the fixed connection to the connecting rod 8 the actuation lever 137 must be raised in order to open the blocking member in the mixed water outlet and lowered to close it, as indicated by the double-headed arrow 41. In contrast, the adjustment of the temperature of the mixed water is carried out in the usual manner by pivoting the actuation lever 137 to the right or to the left as indicated by the double-headed arrow 42.

The invention claimed is:

1. A single-lever mixing gear for a water fitting for dispensing water in a sanitary device, wherein the water fitting comprises a fitting member which is associated with the sanitary device and which has a device for actuating the single-lever mixing gear and the single-lever mixing gear containing a hot-water supply flow and a cold-water supply flow, devices for opening and closing the supply flows and for mixing and limiting the water streams and a closable mixed water outlet which is connected to the outlet in the fitting member of the sanitary device, wherein the single-lever mixing gear and the fitting member are spatially separated from each other, wherein the single-lever mixing gear can be actuated with the device for actuating the single-lever mixing gear via a direct mechanical connection or by an electrical drive, wherein the single-lever mixing gear contains a blocking member in the hot-water supply flow and a blocking member in the cold-water supply flow as devices for opening and closing the supply flows and for mixing and limiting the water streams, wherein the water being introduced through the blocking member in the hot-water supply flow and the water being introduced through the blocking member in the cold-water supply flow can be supplied as mixed water having a temperature which is predetermined by the position of the device for actuating the single-lever mixing gear to the blocking member as a device for opening and closing and for controlling the quantity of water to be discharged from the mixed water outlet of the single-lever mixing gear, wherein the device for actuating the single-lever mixing gear is mechanically connected to the three blocking members as devices for opening and closing or acts as a control of the electromotive drives of those devices, and wherein the blocking member in the hot-water supply flow and the blocking member in the cold-water supply flow can only be actuated together for proportionally opposing control of the quantity of the-water supply flow, and wherein the blocking member for blocking and controlling the quantity in the mixed water outlet can be actuated independently of the blocking member in the hot-water supply flow and the blocking member in the cold-water supply flow.

2. A single-lever mixing gear according to claim 1, wherein the blocking members have two mutually rotatable ceramic plates which are located one on the other, a base plate and a control plate, having mutually closable openings for controlling the flow quantity and for blocking, and wherein the control plate is connected to a spindle which actuates it.

3. A single-lever mixing gear according to claim 1, wherein the blocking members are valve discs for opening, closing and controlling the hot-water supply flow and the cold-water supply flow and wherein the valve discs are connected to a spindle which actuates the valve discs.

4. A single-lever mixing gear according to claim 2, wherein a toothed wheel is connected to the spindle and wherein the toothed wheels of the blocking members are in engagement with the tooth arrangement of an actuation spindle as a device for actuating the blocking members and wherein the actuation spindle is connected to the device for actuating the single-lever mixing gear via a the pin.

5. A single-lever mixing gear according to claim 4, wherein the actuation spindle can be actuated by the device for actuating the single-lever mixing gear via a mechanical connection, in particular in the form of a connecting rod or a helix member having a flexible shaft.

6. A single-lever mixing gear according to claim 4, wherein the tooth arrangement for actuating the blocking members in the supply flows and the tooth arrangement for actuating the blocking member in the mixed water outlet of the single-lever mixing gear are arranged on the actuation spindle separately from each other.

7. A single-lever mixing gear according to claim 4, wherein the rotational movement of the device for actuating the single-lever mixing gear for adjusting the mixing temperature via the tooth arrangement of the actuation spindle in the form of a toothed wheel can be transmitted to at least one toothed wheel of a blocking member in the supply flow of the single-lever mixing gear which is in engagement with the tooth arrangement of the actuation spindle.

8. A single-lever mixing gear according to claim 7, wherein the tooth arrangement of the actuation spindle engages in the two toothed wheels for actuating the blocking members of the supply flows.

9. A single-lever mixing gear according to claim 7, wherein the two toothed wheels of the blocking members of the supply flows are in engagement and the tooth arrangement of the actuation spindle is in engagement with only one toothed wheel for actuating one of the blocking members.

10. A single-lever mixing gear according to claim 4, wherein the tooth arrangement of the actuation spindle is in engagement with the toothed wheel for actuating the valve discs and which are connected to each other via the spindle as blocking members of the supply flows.

11. A single-lever mixing gear according to claim 4, wherein the tooth arrangement of the actuation spindle is in the form of a toothed rod which is in engagement with the toothed wheel for actuating the blocking member in the mixed water outlet of the single-lever mixing gear for converting the pivot movement or lifting movement of the device for actuating the single-lever mixing gear for limiting the quantity and for turning on and shutting off the mixed water in the mixed water outlet into a rotational movement.

12. A single-lever mixing gear according to claim 2, wherein an electromotive drive which can be controlled by the device for actuating the single-lever mixing gear is connected to the spindles of the blocking members.

13. A single-lever mixing gear according to claim 1, wherein a thermal sensor for detecting the mixing water temperature is arranged in the outlet of the fitting member or in the mixed water outlet in order to control the motorized drives of the blocking members in the supply flows.

14. A single-lever mixing gear according to claim 1, wherein a mixed water chamber having an expansion member arranged therein is located in the single-lever mixing gear and wherein the expansion member is connected to the spindle which actuates the valve discs in order to keep the mixing water temperature constant by controlling the water streams in the hot-water supply flow and in the cold-water supply flow.

15. A single-lever mixing gear according to claim 1, wherein a flow quantity sensor is arranged in the outlet of the fitting member or in the mixed water outlet in order to detect the water quantity and wherein this sensor is connected to the motorized drive of the blocking member in the mixed water outlet in order to control the water quantity being discharged.

16. A single-lever mixing gear according to claim 1, wherein a non-return valve is fitted in the hot-water supply flow and in the cold-water supply flow, respectively.

17. A single-lever mixing gear according to claim 16, wherein the non-return valves can be controlled, wherein the non-return valves are closed when the device for actuating the single-lever mixing gear is in a completely closed position and therefore when a blocking member in the mixed water outlet is closed, and wherein it is possible to release the non-return valves only when the blocking member in the mixed water outlet is open.

18. A single-lever mixing gear according to claim 1, wherein the single-lever mixing gear is secured to the sanitary device or the fitting member via a connecting portion below the sanitary device.

19. A single-lever mixing gear according to claim 18, wherein the connecting portion which carries the single-lever mixing gear is secured to the base of the fitting member extending through the sanitary device.

20. A single-lever mixing gear according to claim 19, wherein the connecting portion which carries the single-lever mixing gear extends through the sanitary device and wherein the fitting member is secured to the connecting portion.

21. A single-lever mixing gear according to claim 1, wherein the single-lever mixing gear is positioned on the connections of the domestic supply system.

22. A single-lever mixing gear according to claim 1, wherein the single-lever mixing gear is arranged under plaster.

* * * * *